E. E. MOTTER AND F. G. DAVIS.
TOBACCO HARVESTER.
APPLICATION FILED JUNE 18, 1913.
1,323,404.
Patented Dec. 2, 1919.
9 SHEETS—SHEET 5.
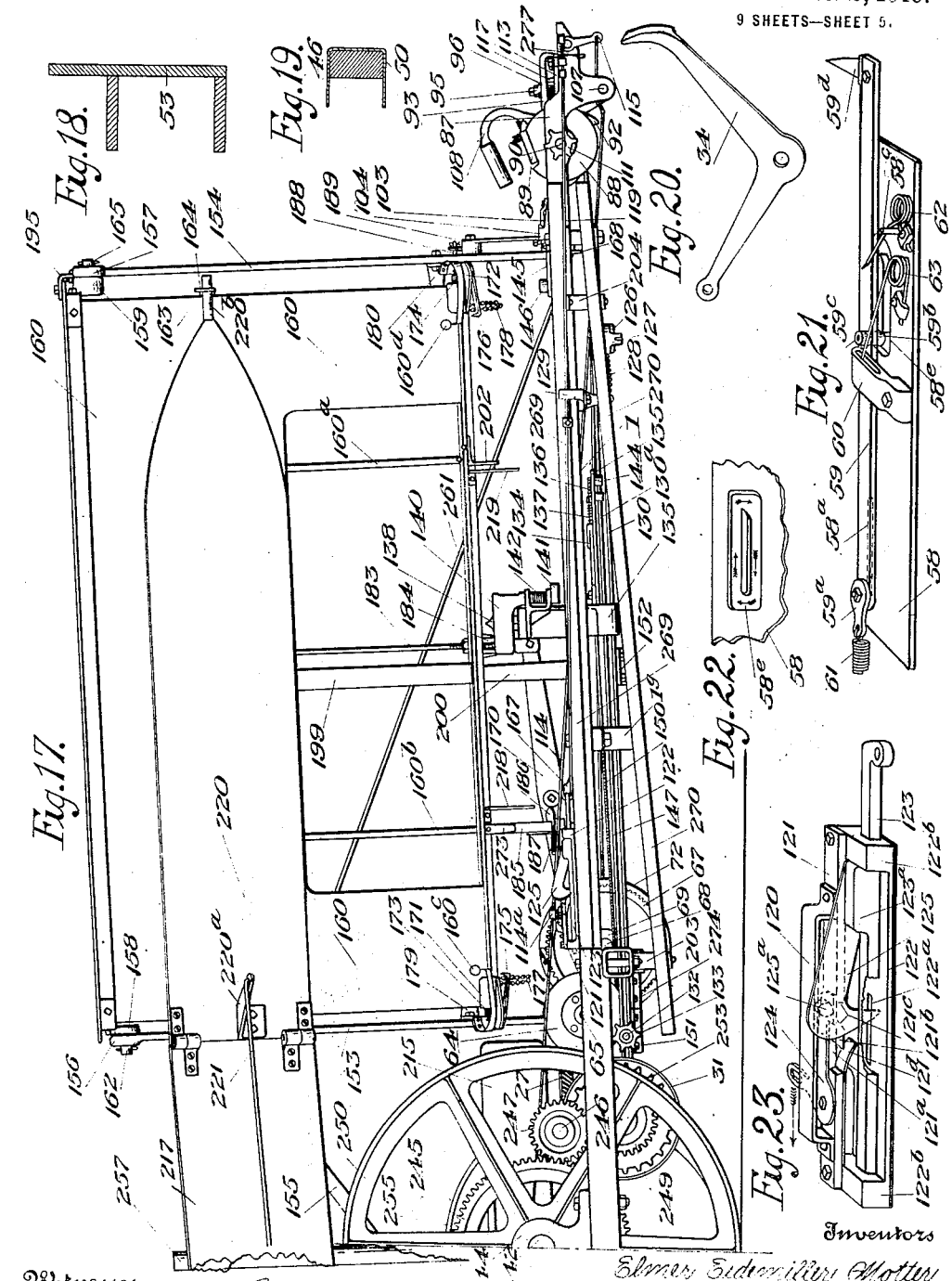

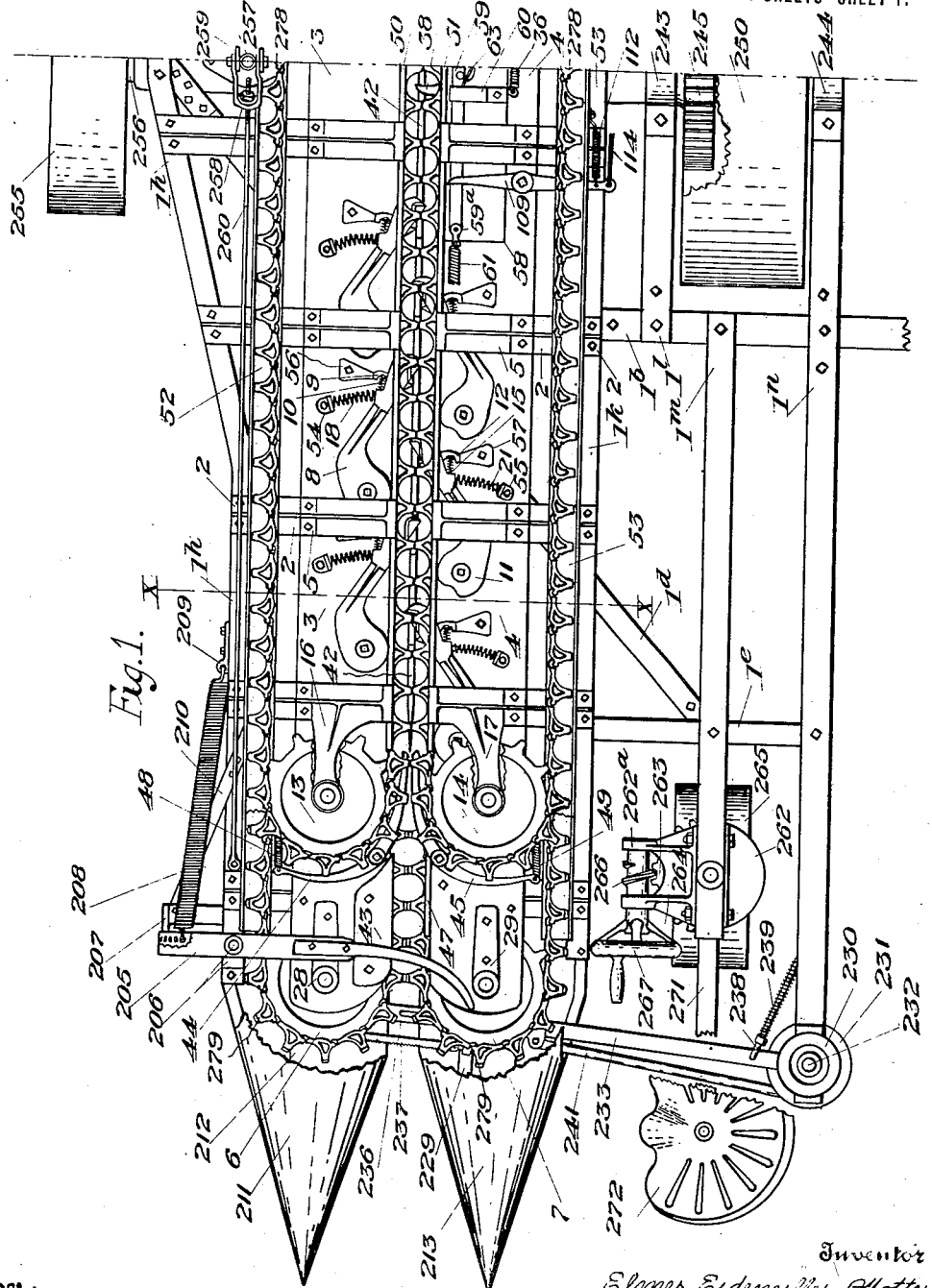

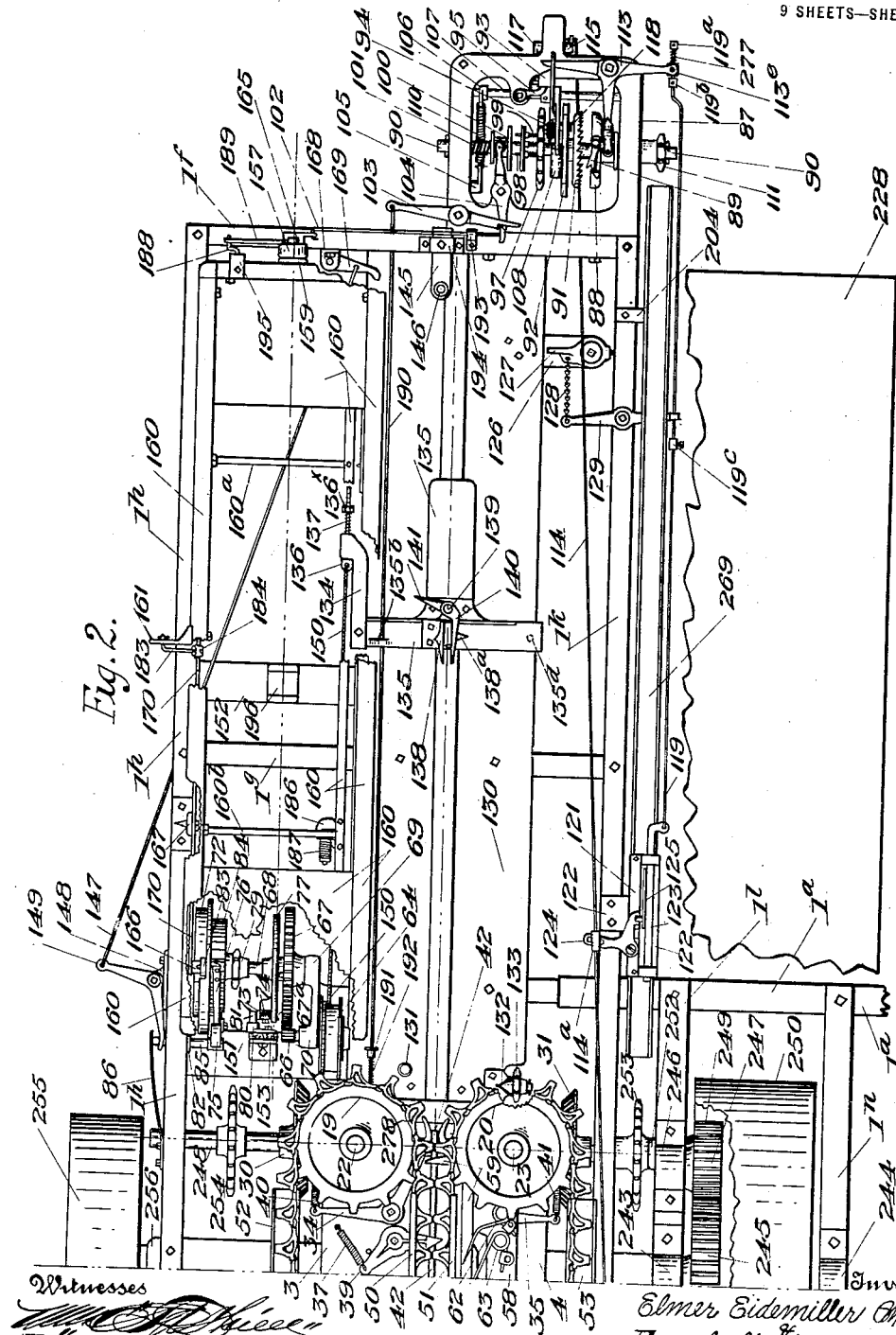

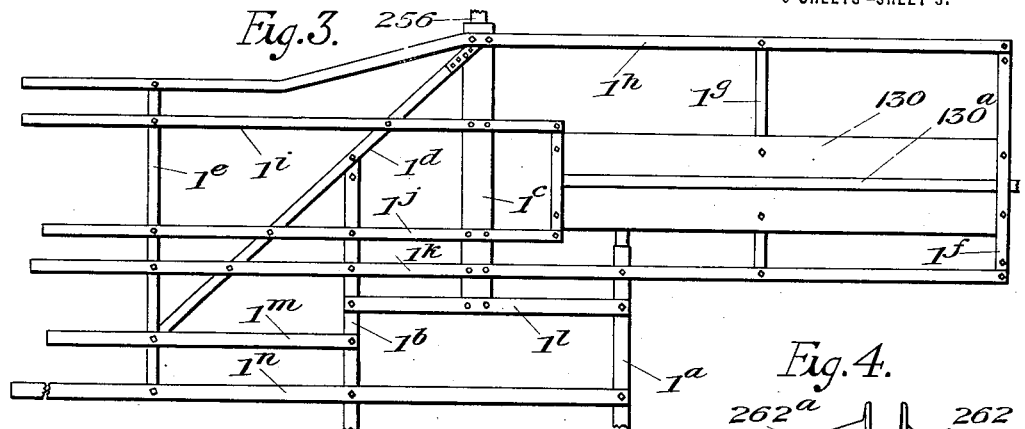
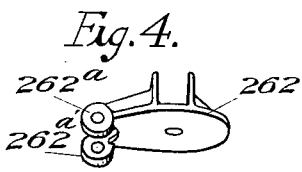
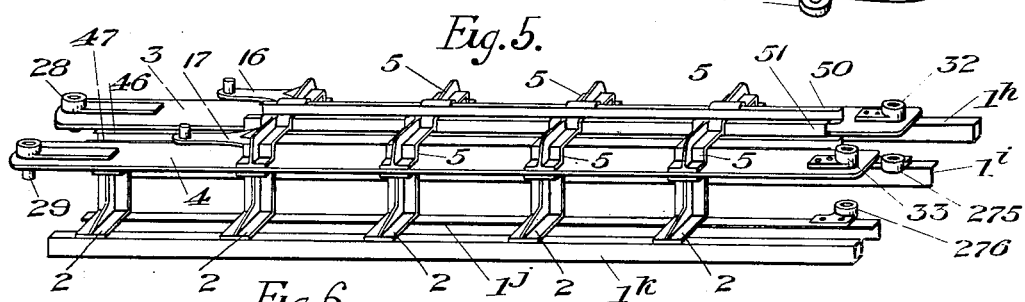
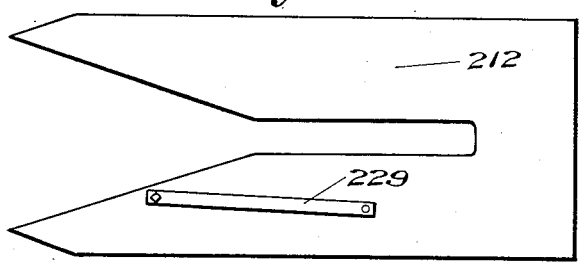
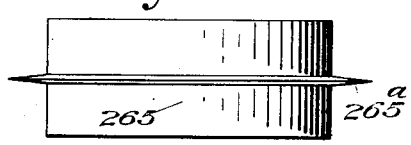
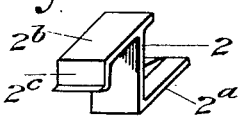
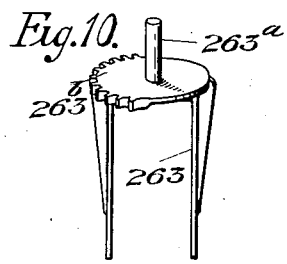
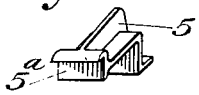

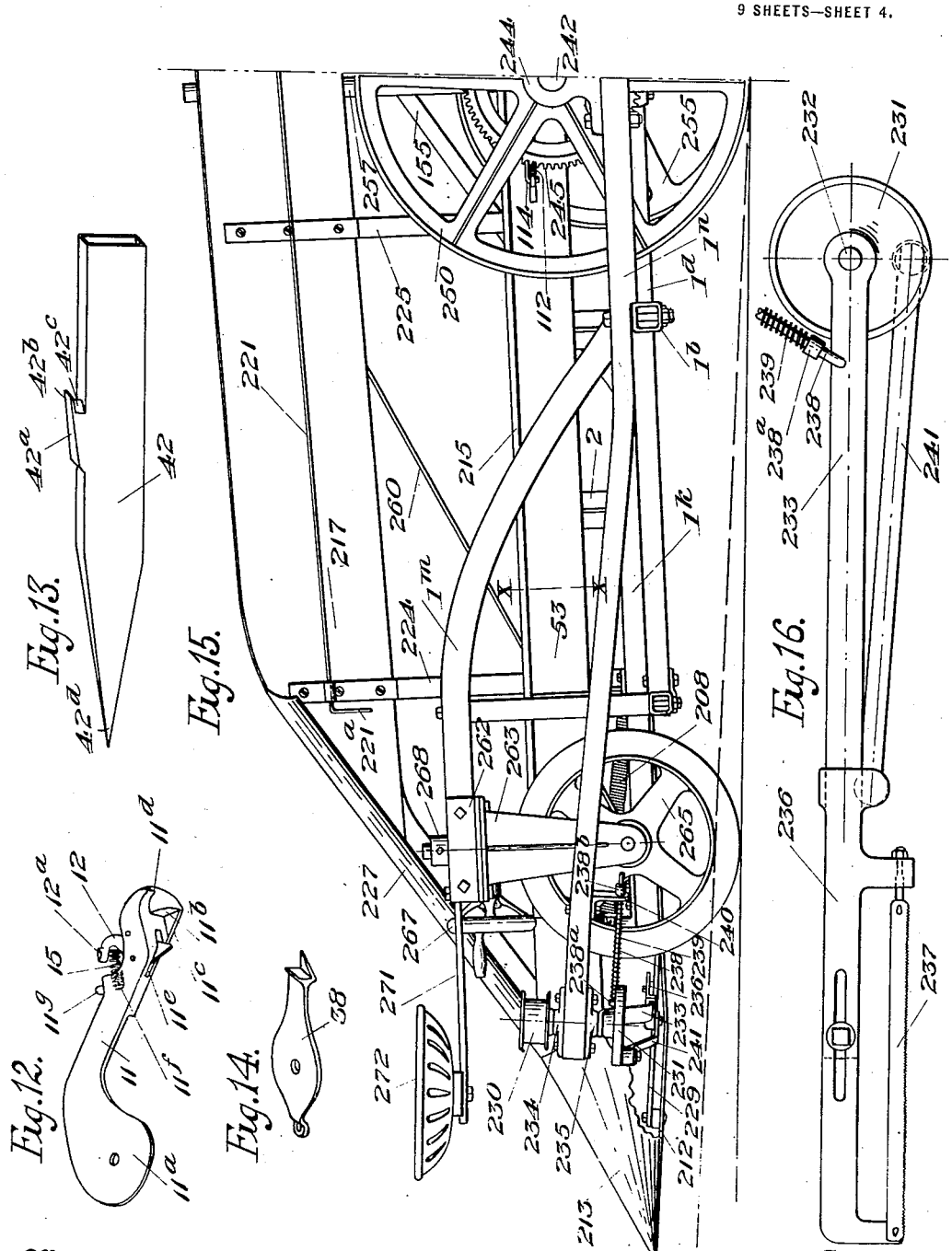

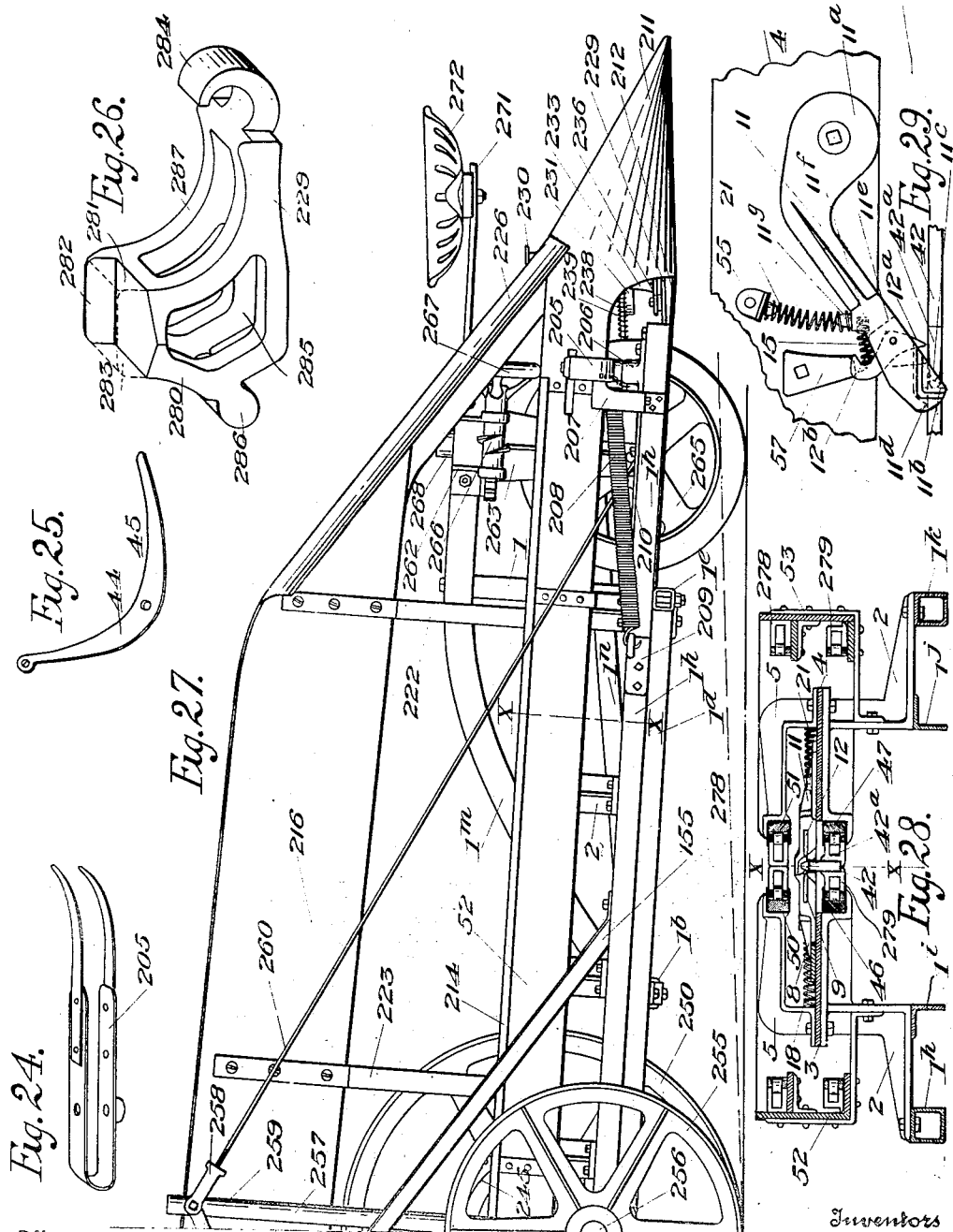

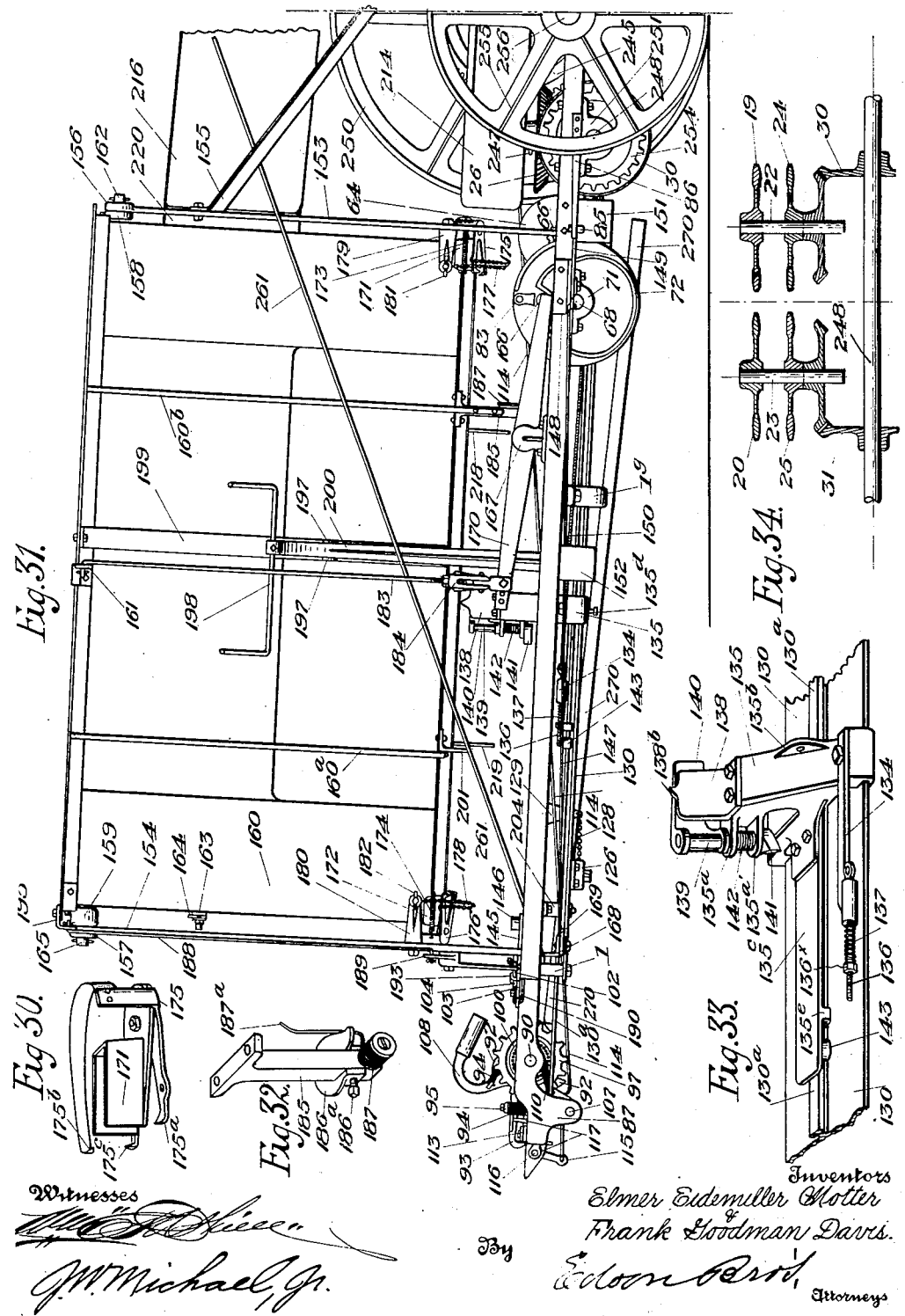

E. E. MOTTER AND F. G. DAVIS.
TOBACCO HARVESTER.
APPLICATION FILED JUNE 18, 1913.
1,323,404.
Patented Dec. 2, 1919.
9 SHEETS—SHEET 8.
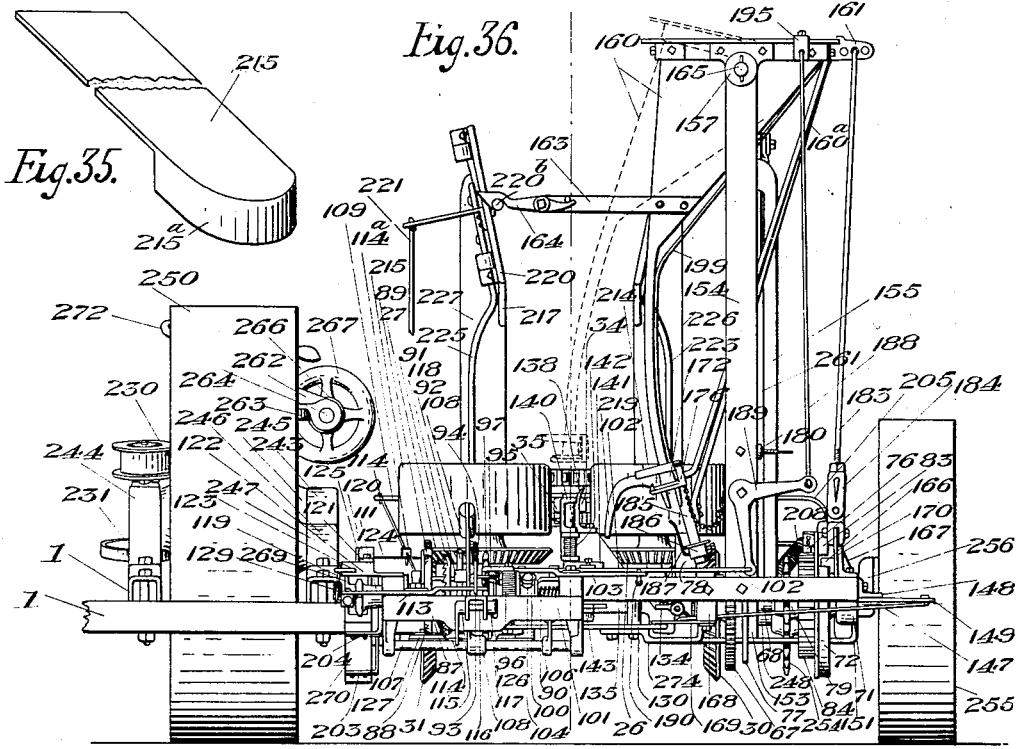

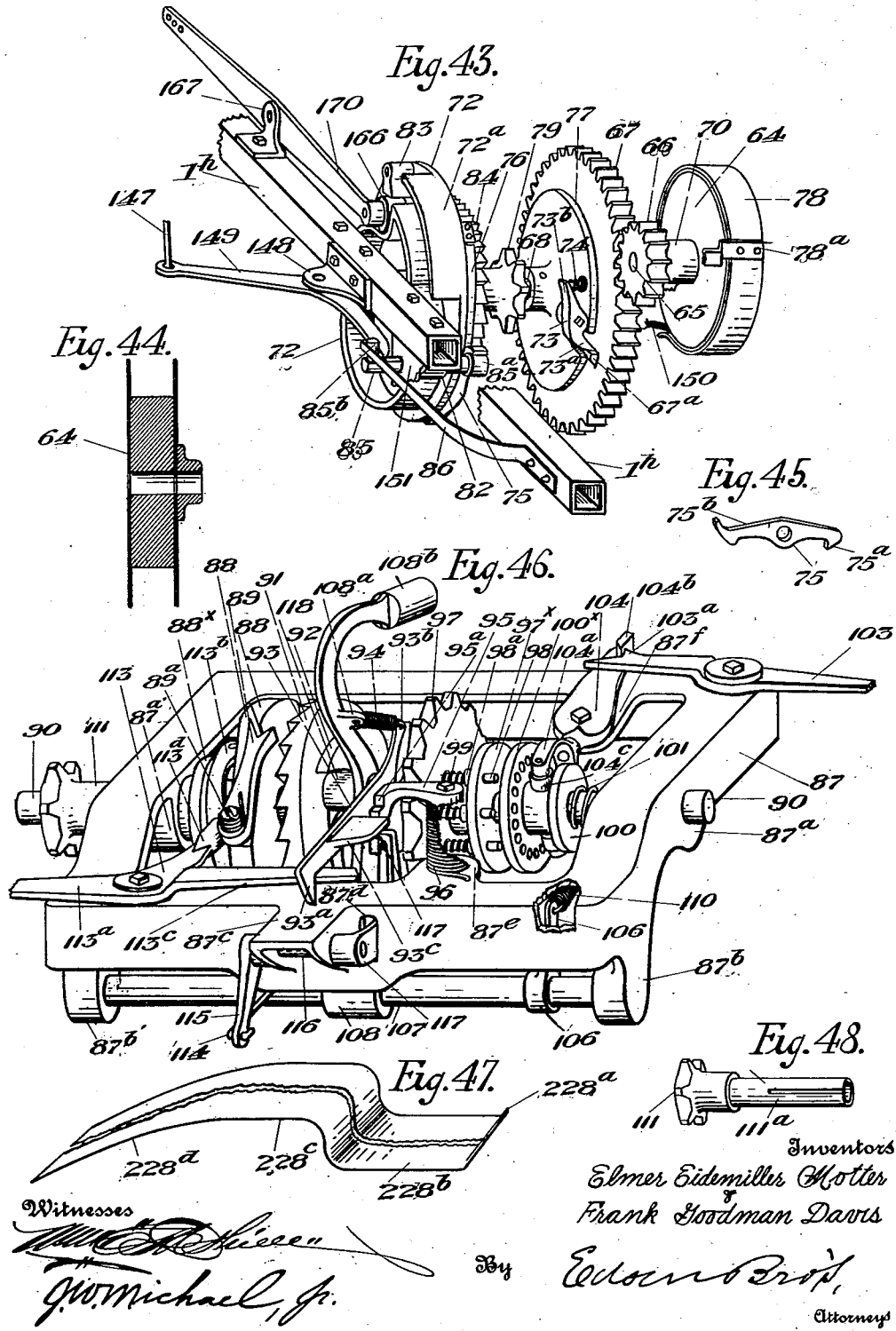

UNITED STATES PATENT OFFICE.

ELMER EIDEMILLER MOTTER AND FRANK GOODMAN DAVIS, OF TIPPECANOE CITY, OHIO, ASSIGNORS OF ONE-THIRD TO ROBERT N. KING, OF OAKWOOD, OHIO, AND FREDERICK H. COOK, OF DAYTON, OHIO.

TOBACCO-HARVESTER.

1,323,404.        Specification of Letters Patent.        Patented Dec. 2, 1919.

Application filed June 18, 1913. Serial No. 774,489.

*To all whom it may concern:*

Be it known that we, ELMER EIDEMILLER MOTTER and FRANK GOODMAN DAVIS, citizens of the United States, residing at Tippecanoe City, in the county of Miami and State of Ohio, have invented certain new and useful Improvements in Tobacco-Harvesters; and we do hereby declare the following to be a full, clear, and exact description of the invention, such as will enable others skilled in the art to which it appertains to make and use the same.

This invention is a harvester, more particularly designed to harvest tobacco. The machine is adapted to travel over the ground and at the same time cut a growing plant from its natural position in a field, thence secure the plant upon a suitable drying member, such as a lath, and thence deliver the drying member to an ejector platform, all of which acts are performed automatically.

The invention contemplates the provision of a machine which may harvest growing plants, such as tobacco, by automatically cutting the stalk and impaling the same upon mechanism carried by the machine and thereafter transmitting the stalk upon a lath or drying member. It is desirable to prevent injury to the leaves of tobacco, and prevent a deposit of foreign matter thereon by precluding the leaves from falling upon the ground. To facilitate the harvesting of plants, the machine is provided with means whereby the severed plants are maintained in their upright or growing position and conveyed through the machine, mechanism being employed to space the plants in such upright position upon the drying lath. This spacing of the severed plants upon the lath permits of the ready drying and proper curing of the tobacco, it being understood that the spacing is automatically arranged by mechanism of the machine. During the conveying of the severed plants through the machine, it is understood that the plants are maintained always in the upright or growing position, the leaves being protected from injury by the working parts of the machine through suitable instrumentalities employed by the machine.

To prevent injury to the plants, the device is provided with a yielding cutting mechanism to compensate for the speed of the machine or the toughness of the stalk, thereby enabling the machine to engage weak or strong stalks continuously, without altering the speed of the machine.

The machine contemplates, also, the automatic supply of a drying member, or lath, from a supply chamber into operative position on the machine; the automatic moving of the lath by a step-by-step feed through the machine, during which severed plants may be placed thereon; and, finally, ejecting the filled lath upon its discharge platform, whence the lath, or drying member, may be conveyed by any suitable means to the drying rack. Moreover, a portion of the drying member, or lath, is left free from engagement by stalks to provide means whereby the member may be suspended on a suitable drying or curing rack.

A further feature of the invention resides in the provision of mechanism, actuated by contact with the plants, for automatically operating a primary and a secondary stalk-trip mechanism, as well as spud-tube holders, lath spacing mechanism, and lath feeding and supply mechanism. The speed of the various coöperating parts is determined, therefore, by the passage of the severed stalks through the machine. Although the operation of the parts are automatic, the machine is under the complete control of a single operator.

In supplying laths, or drying members, from a supply chamber or hopper, it is desirable that but one lath is permitted to escape and be fed to its charging position at a time. Provision is made, therefore, to supply one lath, and only one, each time the hopper is automatically moved to its lath dropping position.

The invention contemplates, also, the agitation of drying laths within the supply chamber or hopper substantially each time a lath is discharged therefrom.

With these and other ends in view, the invention comprises a machine mounted upon suitable traction wheels, and operated by a suitable motor, adapted to be drawn across the filed to harvest successive rows of growing plants. The harvester contemplates the employment of means for guiding the plants to a yielding cutting implement, an advance conveyer for conducting the severed plants to a conveyer companion lever, and guiding levers to direct the severed stalk into contact with another conveyer superposed above said advanced conveyer. A spudding implement is secured within the machine in alinement with one lead of the parallel conveyers, and in alinement with the path of movement of the severed plant. Plant retaining means, in the form of a tube, is secured in coöperative relation with said conveyer and spudding implement, said tube being retained in position in alinement with the path of movement of the severed plant by a series of movable holders. A removable drying member is adapted to be positioned into engagement with said tube for the reception of severed plants which may be conducted upon the drying member by a plurality of conveyers, each plant operating a lever controlling a primary stalk trip mechanism, a secondary stalk trip mechanism, spacing mechanism for the various plants, and a lath-end clutch and carrier device, all of which are properly spaced on the framework of the machine. Mounted upon the frame is a movable hopper forming a supply chamber for the drying laths, and means are operated by the movement of the lath clutch and carrier device to actuate kicker arms for discharging a filled lath from the machine on to a delivery platform and, at the same time, move said hopper into a position to deposit another lath into alinement with the tube of the conveyers. The movement of the hopper transversely across the machine is governed by the harvesting of the plants, and further movement of the machine over the ground operates to restore the hopper to its non-active position. Guides are employed to prevent the removal of more than one lath at a time from the hopper, such guiding mechanism comprising, among other things, pivoted jaws, which operate with a wall of a hopper to limit the downward movement of laths from the supply chamber.

The invention consists, also, in the construction, combination and arrangement of various parts to be hereinafter described, and specified in the appended claims.

One embodiment of the invention is illustrated in the accompanying drawings, but it is to be understood that the disclosures made therein are illustrative, only, and do not define the limits of the invention.

In the drawings:—

Figure 1 is a plan view of the front half of the machine, showing more particularly the double conveying mechanism, the leaf raisers, the cutting mechanism, the spudding tool in position between the conveyers, and the various holders for the spudding tool in their operative arrangement. The superstructures, such as the inclined leaf surfaces, the dirt shields, and leaf boards are removed, and with a part of the main traction wheel and the seat broken away.

Fig. 2 is a plan view of the rear half of the machine showing the termination of the endless conveyers, the lath-end and clutch mechanism slidably mounted upon the central bed plate of the frame, the primary and secondary stalk trip mechanism, the spacing mechanism for the lath or drying member, and the lath supply mechanism for operating the lath hopper, all in plan view. The lath hopper is partly broken away and other superstructure, such as the swinging leaf board, the dirt shields, and power transmission chains are omitted from the view.

Fig. 3 is a plan view of the horizontal framework of the machine, serving as a bed for the superstructure.

Fig. 4 is a perspective view of a foundation piece for the front wheel mechanism, serving as a base for steering the machine.

Fig. 5 is a perspective view of the arrangement of a portion of the superstructure on a part of the frame shown in Fig. 3, which serves to mount the conveyers and other parts of the spudding device.

Fig. 6 is a plan view of the ground plate having the cutter bar secured thereto.

Fig. 7 is a perspective view of a foundation piece for the front lath hopper standard.

Fig. 8 is a plan view of the front steering or guiding wheel illustrating its sharp, knifelike flange.

Fig. 9 is an enlarged perspective view of one of the upper inner chainway supporting arms, shown also in Fig. 5.

Fig. 10 is a perspective view of the housing for the front guiding wheel.

Fig. 11 is an enlarged perspective view of a member of the supporting structure for the conveyer chain, the reverse face of said part being shown in Fig. 5.

Fig. 12 is a perspective view of the under side of one of the holders for the spudding tube, said holder being shown as pivotally mounted upon the base plate of Fig. 1.

Fig. 13 is a perspective view of the plant-engaging end of the spudding tube.

Fig. 14 is a perspective view of the lateral tube holder, looking from the under side thereof.

Fig. 15 is a side elevation of the front half of the machine looking from the left, a part of the leaf raising member being broken away.

Fig. 16 is an enlarged view of the cutting mechanism.

Fig. 17 is a side elevation of the rear half of the machine, looking from the left, which is also a continuation of the structure shown in Fig. 15.

Fig. 18 is a cross section through one of the outer double chainways.

Fig. 19 is a cross section through one of the four inner chainways.

Fig. 20 is a perspective view of the left lath end-guide, two of which are shown at the left end of Fig. 2.

Fig. 21 is a perspective view of the primary stalk trip mechanism.

Fig. 22 is an enlarged perspective view of the rectangular roller course of the plate of said primary trip mechanism.

Fig. 23 is a perspective view of the secondary trip mechanism which operates in conjunction with the primary mechanism.

Fig. 24 is a perspective view of the conveyer companion lever, shown also in plan view in Fig. 1.

Fig. 25 is a perspective view of one of the stalk guides which guides the stalks toward the speed point, shown in Fig. 1.

Fig. 26 is an enlarged perspective view of one of the links of the endless conveyer chains.

Fig. 27 is a side elevation of the front half of the machine looking from the right.

Fig. 28 is a transverse sectional view through the machine's chainway on the line $x-x$ of Fig. 1, as well as on the line $x-x$ of Figs. 15 and 27.

Fig. 29 is a plan view of one of the tube holders mounted upon the plate to which it is attached, showing a fragment of the tube in engagement with the holder.

Fig. 30 is an enlarged perspective view of one of the lath droppers which is positioned at the lower end of a lath hopper, shown in Fig. 37.

Fig. 31 is a side elevation of the rear half of the machine looking from the right, which is a continuation of the mechanism shown in Fig. 27.

Fig. 32 is an enlarged perspective view of the lath catcher and guide which is suspended from the hopper mechanism of Fig. 37.

Fig. 33 is a perspective view of the lath-end clutch and carrier, shown mounted upon the plate track upon which it rides.

Fig. 34 is a sectional view through the gears and sprocket wheels which drive the four endless conveyers.

Fig. 35 is a perspective view of one of the dirt shields, shown broken away and shortened.

Fig. 36 is a rear elevation of the machine, omitting the power transmission, chains, the lath agitator and its foundation piece. The movement of the lath hopper is shown in full lines in its rest position, and in dotted lines in its lath-supplying position.

Fig. 37 is a perspective view of the lath hopper.

Fig. 38 is a perspective view of the swinging leaf board, broken away and shortened.

Fig. 39 is a perspective view of the lath agitator.

Fig. 40 is a perspective view of one of the lath dropper chain anchor arms, with its chain adjusting thumb screw.

Fig. 41 is a perspective view of one of the hopper lath kicker arms.

Fig. 42 is a perspective view of the special trip for the lath end clutch and which is also shown in plan view at the right end of Fig. 2.

Fig. 43 is an enlarged perspective view of the lath supply mechanism with a portion of the frame member on which it is mounted partly broken away. This mechanism is shown in plan view at the upper left portion of Fig. 2.

Fig. 44 is a vertical sectional view through the pulley of the lath supply mechanism.

Fig. 45 is a perspective view of the hook pawl shown also in the lath supply mechanism.

Fig. 46 is an enlarged perspective view of the spacing mechanism, parts being broken away. This mechanism is shown, also, in plan view at the right end of Fig. 2.

Fig. 47 is a perspective view of the delivery platform which is shown broken and shortened.

Fig. 48 is a perspective view of the sprocket wheel and sleeve of the spacing mechanism shown in Fig. 46.

The harvester is composed of a suitable framework and superstructure adapted to be moved over the ground through the medium of a plurality of traction wheels, some of which are properly coupled to suitable means, such as a motor for imparting movement to the traction wheels. The machine contemplates the attendance of a single operator, mounted preferably at the front of the harvester, where he can guide and direct the movement of the machine across a field, as well as the various operations of the parts. The arrangement of the various parts precludes the necessity of additional attendants, except to recharge the hopper or reservoir with drying members or laths, and to receive the filled drying members as they are being discharged from the machine. The harvester may be employed in connection with other means to receive and convey the filled drying members to a suitable place of storage for the purpose of curing the tobacco, or the drying members with the stalks secured thereon may be removed from the machine by hand labor, or allowed to fall upon the ground.

In the embodiment of the invention disclosed in the accompanying drawings, the harvester mechanism is mounted upon a suitable framework shown somewhat rectangular in form in Fig. 3. This framework, which is indicated by the numeral 1, is shown as comprising short transverse members $1^a$, $1^b$, $1^c$, $1^d$, $1^e$, $1^f$, $1^g$. The longitudinal members are shown at $1^h$, $1^i$, $1^j$, $1^k$, $1^l$, $1^m$, and $1^n$. The member $1^k$ is shown extending from the transverse member $1^f$ at the right end of the frame to and beyond the member $1^e$ at the left end of the frame. The member $1^h$ also extends for this distance, but is curved inwardly between the member $1^c$ and $1^e$, as will be understood from an inspection of Fig. 3. Member $1^g$ connects members $1^k$ and $1^h$, and acts as a supporting means to the central bed plate 130 having its raised track $130^r$ to be hereinafter referred to. This bed plate is suitably secured to the members of the framework.

The members $1^h$ and $1^k$ are preferably hollow rectangular members, as shown in Figs. 5 and 28, to insure rigidity of construction and secure the desired reduction in weight. Members $1^l$ and $1^j$ are preferably angle irons, as well as the various other members, although the specific construction of these members is to be determined by the nature of the strain to be placed upon them. The member $1^c$ is preferably of greatest thickness or diameter than the other members of the framework, inasmuch as it is required to support the greater amount of weight and withstand the most strains. One end of this member $1^c$ is formed with a reduced portion 256 serving as the axle for one of the traction wheels 255, shown in Fig. 1. Another of the traction wheels 250, and the largest disclosed in the drawings, is mounted within the rectangular space formed between the members $1^a$, $1^b$, $1^l$ and $1^n$, so that the wheels 250 and 255 support the greater portion of the weight of the machine.

Mounted upon the outer end of the member $1^m$ is a suitable guiding wheel 261 of Fig. 1, which serves to direct and guide the movement of the harvester over the ground or through a field. While the harvester is disclosed as provided with only three wheels, it is obvious that additional wheels may be employed should it be found desirable to facilitate the movement of the harvester over soft ground and thereby distribute its weight. The framework is provided, also, with a diagonal member $1^d$ which connects the outer end of the member $1^c$ with the members $1^m$ and $1^e$. This member is employed to support the various plates and superstructure for the endless conveyers, as well as the plates which support the tube holders, to be hereinafter described.

It is obvious that the framework may consist of additional members should it be found necessary to more securely support certain of the working parts. The members $1^a$ and $1^b$ are shown broken away but in practice they are extended out sufficiently far to provide a support for a motor, should it be decided to operate the machine through motor power. This arrangement would serve to throw most of the weight of the machine and all the weight of the motor on the large drive wheel 250.

The motor, not shown, is preferably connected to the drive wheel 250 by such gearing as will adapt the speed of the motor to the necessarily slow speed of the machine. This main wheel 250, shown in Figs. 1, 2, 15, 17, 27, 31 and 36, is preferably fixedly secured on a short shaft 242 (see Figs. 15 and 17) which shaft turns in bearings 243 and 244 secured to the frame members $1^l$ and $1^n$.

This short shaft 242 also carries a special spur gear 245 fixedly secured thereto.

On the opposite side of the machine is mounted the stout spindle 256 which is preferably forged on the heavy bar $1^c$ of the frame, said bar, as heretofore stated, being rigidly secured across the under side of the machine's frame, as disclosed in Fig. 3.

Mounted upon and securely bolted to the members $1^k$, $1^j$, $1^h$ and $1^i$ are angular bracket members 2 and 5, which form a part of the conveyer chain supporting structure. These bracket members are shown more particularly in Figs. 9 and 11. The plates 3 and 4 are secured between the brackets 2 and 5, and serve as a supplemental bed for the conveyer mechanism, and for the series of tube holders, which are adapted to be pivotally mounted upon the plates 3 and 4. This structure to be hereinafter referred to, serves as means for supporting the bearings for the various sprocket wheels. To the top of the bar $1^c$, on the right side of the machine (shown more particularly in Fig. 1) is rigidly secured an upstanding member 257, serving as a support, at the top of which is provided a plurality of clevises 258, 259. These clevises provide connection for suitable brace rods 260 and 261 extending from the top of the standard 257 to the front and rear portions of the framework. The standard 260 is shown in Fig. 27, connected to the member $1^h$ near the front end thereof, while the member 261 is connected to said member $1^h$ near the rear end of the machine, as will be understood from Fig. 31. These brace rods 260 and 261 are drawn tight by any suitable means, such as providing threaded ends and nuts in the clevises, and any other suitable means, such as turnbuckles, positioned intermediate their ends.

The steering wheel 265, which is mounted upon the forward end of frame member $1^n$ operates to guide the machine in any desired direction over the ground. This wheel is provided with a sharp peripheral flange $265^a$, shown more particularly in Fig. 8 of the drawings. The frame member $1^m$ is suitably perforated to receive the spindle $263^a$ of a suitable housing 263 (of Fig. 10). This housing is provided with an upper plate and depending arms, as will be readily understood from Fig. 10, said arms being provided with upstanding fins, or other means to strengthen the same against lateral strains. The upper plate is provided, also, with gear teeth 263$^b$ adapted to mesh with the worm 266, as shown in Fig. 1. The upper plate 262, shown more particularly in Figs. 1 and 4 fits upon the elevated or upwardly directed frame member 1$^m$ and is provided with a flat circular under face and a pair of extending bearings 262$^a$ and 262$^{a1}$. This flat circular plate is provided with a substantially central opening for the passage of the spindle 263$^a$ of Fig. 10. A collar 268, shown more particularly in Fig. 15, is employed to maintain the spindle 263 and plate 262 in operative position upon the frame member 1$^m$.

The flat surfaces of the parts 262 and 263, being retained into frictional contact by a portion of the machine's weight, and also by the collar 268, gives the required firmness to the part 263, which carries the flanged wheel 265.

The worm 266, shown more clearly in Figs. 1 and 27, is adapted to mesh with the teeth 263$^b$ of the plate 263. This worm is mounted between bearings 262$^a$ and 262$^{a1}$. To the forward end of the shaft 264, carrying the worm 266, is mounted a hand wheel 267 for operating the worm, which in turn moves the plate 263 in a direction to turn the guide wheel 265 to the right or left for the purpose of directing the movement of the machine. As heretofore stated, this guide wheel 265 is provided with a sharp deep flange 265$^a$ which permits the machine to be guided without deviations.

The upper structure shown in Fig. 5, which is mounted upon frame members 1$^h$, 1$^i$, 1$^j$ and 1$^k$ forms proper accommodations and sufficient location in space for the several parts which carry out the necessary operations upon the plants to be harvested.

The first step in the formation of this upper structure for the foundation is to bolt several pairs of the bracket members 2 at regular intervals along the frame members 1$^h$, 1$^i$, 1$^j$ and 1$^k$, as disclosed in Fig. 5. These parts or brackets are formed to produce a lower surface 2$^a$ which is adapted to be bolted to the frame members, (see more particularly Fig. 11). This surface 2$^a$ is preferably made longer on two of the parts at the right side of the machine for the purpose of reaching the outwardly bent frame member 1$^h$. An upper surface 2$^b$ provides suitable foundation for the bed plates 3 and 4. The lateral surface 2$^c$ is provided to fasten the two lower inner steel chain channels 46 and 47. The surface 2$^b$ of the several parts 2 is lined up with the inner frame members 1$^i$ and 1$^j$, and to these surfaces 2$^b$ are secured the steel plates 3 and 4.

These plates 3 and 4 are provided at their front ends with stud pin bearings 28 and 29, the studs of which are shown extending downwardly, on which bearings are mounted the idler sprockets 6 and 7, respectively. At the rear ends of these plates 3 and 4 are provided the bearings 32 and 33 in which are journaled short shafts 22 and 23, shown more particularly in Fig. 2 of the drawings.

To the several surfaces 2$^c$ of the parts 2 are secured the steel conveyer chainways 46 and 47. These chainways serve as bracket carrying guides for the backward traveling or inner stretches of the two lower endless conveyer chains 279.

One of the parts 2 is preferably omitted from the right side of the front of the machine to prevent interference with the swinging of a plant supporting member 205, to be hereinafter referred to. The plate 3 is provided with a stalk guiding plate 43, the stalks bearing against this plate while being carried by the lower conveyers and the lever 205. Plate 3 may be stiffened, if desired, by a rib (not shown) secured to the under surface of the plate and extending rearwardly.

Directly above each member 2, or in vertical alinement therewith, is mounted a somewhat smaller supporting member 5, shown more clearly in Figs. 5 and 9. In the drawings, three pairs of these members 5 are employed, and also similar members 16 and 17. All of these parts 5, 16 and 17 are so constructed that they extend high enough to provide proper working area for the tube holders 8, 9, 10 and 11, which are mounted upon the plates 3 and 4, as shown in Fig. 1. Each of these parts 5, 16 and 17 is provided with a surface 5$^a$ which is secured face to face against the steel conveyer channels 50 and 51. These channels 50 and 51 are in the same vertical plane, respectively, with the lower channels 46 and 47 previously referred to and are substantially the same in cross section, as will be seen from Fig. 28, except that they are shorter. The parts 16 and 17 are constructed similar to parts 5, except that they are provided with stout pin bearings on which are mounted the front upper idler sprockets 13 and 14, shown in Fig. 1. Shafts 22 and 23, shown in Fig. 2, are adapted to be mounted in the bearings 32 and 33 (Fig. 5) of the plates 3 and 4 and also in corresponding bearings 275 and 276 on the framework 1$^i$ and 1$^j$. These shafts 22 and 23 support the sprockets 19 and 20 above the bearings 32 and 33. These sprockets drive the two upper endless conveyer chains 278. Below the bearings 32 and 33 are mounted the sprockets 24 and 25, which drive the two lower endless conveyer chains 279, as will be understood from an inspection of Fig. 34. On the lower end of the shafts 22 and 23 are mounted the bevel or miter gears 26 and 27 which are adapted to mesh with the beveled gears 30 and 31, carried by the power transmission shaft 248.

The outer and forward traveling stretches of the four endless conveyer chains are supported by the duplex outer chainways 52 and 53. These chainways are provided with two chain supporting shelves or horizontal surfaces, as will be understood from an inspection of Fig. 28. The outer chainways are secured to the structure in any suitable manner, so that the tops of their chain supporting shelves lie in the same horizontal plane as the lower inner surfaces of the metallic ways which carry the inner backward traveling stretches of the conveyer chains.

The four endless conveyer chains 278 and 279 are composed of a series of links 280, preferably of a special form, such as disclosed in Fig. 26.

Each of the links, which compose the lower chains 279, is provided with a deep recess on its face, leaving a small projecting tit 282. The links which compose the upper chain 276 are not provided with the recessed face, but instead a block of metal 283 closes the space substantially as disclosed in dotted lines in Fig. 26. This block of metal may be cast integral with the rest of the link or secured thereto after the link has been formed. These links should be constructed as rights and lefts so that when they are assembled into a chain on their respective sprockets, the tits 282 of the lower pair of chains, and the faces of the upper pair of chains along the inner stretches, respectively, will engage or touch each other. The hook end 284 of all links should be assembled toward the front of the machine when on the inner stretches. This arrangement of the links with their hook ends toward the front is preferable since the teeth of the driving sprockets operate inside the high open or extended portion 285 of the links so that the sprocket wheels will not interfere with tobacco stalks which are intended to occupy the curved recess or grip 287 formed by the assembled chains running in unison on their respective sprockets. When a pair of chains are operated synchronously the ends 283 or tits 282, indicated as shown in Fig. 1, form an opening between the link members of the chain, said opening being of sufficient size to grasp a stalk of tobacco or other plant intended to be harvested.

The long recess between the inner stretches of the lower conveyers 279, thus formed by the opposed recessed faces 283 of the various links, is the resting place for the spud and lath tube 42 which is shown more clearly in Fig. 28, said lath tube substantially filling the space. This tube 42, therefore, is held laterally and supported in correct position by the link surfaces of the continuously traveling chains and at the same time is retained against spudding pressure, and the pressure due to friction of the passing stalks, by suitable locking holders 8, 9, 10 and 11, shown more clearly in Figs. 1, 12 and 29. These holders 8, 9, 10 and 11 are spaced along the plates 3 and 4, as disclosed at Fig. 1. At the rear of the tube 42, where there are no holders of the type disclosed in Fig. 12, the tube is laterally braced, at the top thereof, by the stalk passing holders 38 and 39 (shown in Figs. 1, 2 and 14) which holders are pivoted to the plates 4 and 3, respectively. These holders 38 and 39 are provided with pull springs 36 and 37 which cause them to remain in holding position at all times, except when they are being swung on their pivots by a passing stalk. The lath end guides or levers 34 and 35 (shown in Figs. 2 and 20) are also pivoted to the plates 3 and 4, and these guides are provided with springs 30 and 41 to retain them in position and at the same time permit of the passing of the stalks off of the tube 42 on to a drying member or lath (not shown).

Any number of the stalk passing locking holders 8, 9, 10 and 11 may be employed. By reference to Figs. 12 and 29, it will be observed that each holder is composed of a main part 11, a locking part 12, and a spring 15. The main part of the holder 11 is formed to provide an extensive flat area $11^a$, which is drilled to provide a hole for the passage of a bolt for the purpose of retaining the holder upon the plate 4, and to give it horizontal stability in movement. A limiting point or shoulder $11^d$ is adapted to contact with the lath tube 42. The surface $11^b$ of this point is preferably hardened to withstand the wear and direct force of the spudding pressure. A guiding surface $11^c$ permits the tobacco stalks to swing the holder 11 out of their path of movement caused by the conveyers after the stalk has unlocked the member. The holder 11 is provided, also, with a slot $11^e$ to accommodate the mounting of the locking member 12. The holder is provided, also, with a socket or hole $11^f$ to accommodate a spring 15, one end of which is seated in said socket, while the other end engages a lug $12^b$ upon the member 12. Adjacent the recess $11^f$ is formed a lug $11^g$ which is adapted to be engaged by one end of a spring 21. As shown more particularly in Fig. 12, the locking member 12 is pivoted in the slot $11^e$ of the main portion of the holder 11, allowing one end of the member 12 to project into the path of movement of the tobacco stalks, while the other end is provided with a spring retaining lug and a downwardly extending locking lug $12^a$. The spring 15 is so mounted that one end is seated in the socket $11^f$ of the holder 11, while the other end of said spring engages a lug upon the locking member 12. It is preferred to make these holders in rights and lefts, to be pivotally mounted upon the bed plates 3 and 4, as shown in Fig. 1.

After having been pivoted to their respective bed plates 3 and 4, the holders are so positioned that their swinging ends are directed toward the center of the machine which is occupied by the lath tube 42. When in this position, the limiting point 11$^d$ of each of said holders engages the side of the tube 42.

In the drawings there is disclosed three pairs of retaining pieces 56 and 57, mounted on the plates 3 and 4, one for each of the holders. Each of these pieces 56 or 57 is provided with a hardened edge, and a curved edge. These members are of a thickness slightly less than the depth of the lug 12$^a$ on the under side of the locking member 12 of the holder 11. The hardened edge which is of small area provides a fixed point against which the lug 12$^a$ of the member 12 abuts when the holder is locked, while the curved edge provides a guiding path for said lug 12 when the holder member is moved outwardly by a passing stalk. To provide the power by which these holders are returned to their locked position, after a stalk is moved past its holding point by the conveyer chains, there is provided the spring backers 54 and 55 which are secured to the plates 3 and 4 having coiled springs 18 and 21 interposed between said backers and the holders, (see Fig. 29). The springs are retained in position by any suitable means, shown in the drawings as secured to the lugs 11$^g$ on the member 11 and a lug on backer 55.

The plates 3 and 4 are positioned on the frame of the machine to form a "plant passage" through the harvester in which passage is adapted to be mounted the lath and spud tube 42, which is retained in its operative position by the holders previously described.

To coöperate with the several holders hereinbefore described, there is provided a plurality of projecting parts 42$^a$ upon the top of the spud and lath tube, as shown more clearly in Fig. 13. One of these projections is provided for each of the locking holders. The projections are preferably formed to provide a gradually raised outer face so that the rear end of the projection is at a greater distance from the main wall of the tube than the front thereof. The rear wall of the projection is preferably formed to provide a horizontal portion 42$^b$ and a vertical edge 42$^c$, as will be understood by reference to Fig. 13. It may be found desirable to harden the metal forming the horizontal portion 42$^b$, in view of the wear on these parts. This horizontal hardened edge 42$^b$ of each projection is the part which abuts against the hardened holding surface 11$^b$ of its respective holder, to bear the spudding pressure. Moreover, it is preferred that this portion shall be sharpened, as well as its vertical edge 42, for the purpose of cutting any trash which might be entrapped between these parts and the hardened surface of the holder when said holder flies back to its locking position after the stalk has passed the point. This cutting of the trash will permit the members to reengage and become locked, thereby preventing any accidental displacement of the parts by trash accumulating at these points.

Stalk guides or levers 44 or 45 (see Figs. 1 and 25) are provided to guide the stalks of tobacco to the point 42$^d$ of the spudding tool, which pierces the stalk about centrally thereof. These stalk guides or levers are pivoted to the plates 3 and 4 with their rearward extending arms positioned to perform the guiding function, while their laterally extending arms are perforated to receive the end of a spring connection 48 or 49. The other ends of these springs are connected to suitable parts of the machine, such as the plates 3 and 4. By reference to Figs. 1 and 2, it will be seen that the two upper endless conveyer chains 278 are mounted upon their respective sprockets 13 and 19, and 14 and 20. The inner and outer stretches of these chains are supported by and travel along the inner and outer chainways 50, 51, 52 and 53, as previously described.

A vertical stud pin 206 is mounted upon the front end of the frame member 1$^h$, as shown in Figs. 1 and 27, to which pin is portably mounted the swinging conveyer companion lever 205, which is shown more clearly in Fig. 24. This lever is held at the proper tension in the position shown in Fig. 1 by a spring 208, one end of which is adjustably connected to an end of the lever 205, while the other end of said spring is fastened to an eye portion 209 bolted upon the member 1$^h$. The forward movement of the outer curved end of this lever is limited by its short square end engaging a stop member 207 carried by the frame member 1$^h$. This stop member 207 may be braced, as at 210, to withstand the impact of the end of the spring against the same, if it be found necessary. A ground plate 212, shown more clearly in Fig. 6, is rigidly secured to the lower sides of the front ends of the frame members 1$^i$ and 1$^j$. This ground plate forms an entrance guide for the growing plants to move into the machine, and also provides a foundation for the curved leaf raising point 211 and 213, shown in Fig. 1. These leaf raising members are preferably of sheet metal and substantially conical in form to protect certain of the working parts, although it may be found desirable to construct them of different contours. A stiff metallic strip 229 is preferably secured upon the upper surface of the plate 212 to provide a suitable supporting medium for the sliding movement of the rearwardly and forwardly swinging bar 233 of the cutting mechanism (Figs. 1 and 16). This bar is so mounted upon the framework 1ⁿ that it moves in a horizontal plane across the front of the machine.

Mounted at the front of the machine, and supported by member 1ⁿ of the frame is the cutting mechanism for severing the stalks from their growing position in a field. The mechanism disclosed is shown more clearly in Figs. 1 and 16 and comprises a shaft 232 pivotally mounted in bearings 234 and 235 by which it is secured to the upper and lower surfaces of the frame member 1ⁿ. A flange pulley 230, shown more particularly in Fig. 15 is mounted on the upper end of the shaft 232, through which pulley power is transmitted by a belt (not shown) from a motor to the cutting mechanism. On the lower end of this shaft is secured a pitman wheel 231, as will be understood from an inspection of Figs. 15 and 16. A bar 233 is mounted on the shaft 232 between the bearing 235 and the wheel 231. This bar 233 is downwardly offset or bent as near as possible to the wheel 231 so that the greater part of its length lies in a lower horizontal plane than does the end which is secured to the shaft 232, as will be understood from an inspection of Fig. 15. On the bar 233 is slidably mounted a frame 236 which is adapted to carry a suitable form of cutter, shown in the drawings as a saw blade 237, the teeth of which are so formed as to cut the stalks of plants in either direction of movement of the blade.

This slidable saw frame 236 is connected to the pitman wheel 231 by a suitable pitman 241.

To maintain the cutter in its operative position with the blade 237 ready to engage the stalks when carrying out the cutting operation, there is provided a suitable member which permits of a yielding action to the cutter frame. This is especially essential when the cutter is attacking large stalks which cannot be cut with the same rapidity as the average stalk, in view of the movement of the machine over the ground. One means of accomplishing this end is disclosed in Figs. 15 and 16, wherein a rod 238 is provided, having one end pivotally secured in a suitable hole in the bar 231, while the other end is slidably mounted through an eye of a fixed piece or bracket 240 secured to the under side of frame member 1ⁿ in Fig. 15. This bar is provided with a collar 238ᵃ against which bears a spring 239. The other end of the spring is adapted to engage the bracket 240 for the purpose of exerting energy against the bar to force the same outwardly in the direction of movement of the machine. It is desirable to have the cutter blade normally in the operative position shown in Fig. 1 and this object may be attained by the regulating collar 238ᵇ which is mounted on the free end of rod 238, and is adapted to engage the bracket 240 to serve as a stop member against the forward or outward movement of the cutter frame.

To protect the leaves of the tobacco stalks when passing through the machine, there are provided suitable leaf boards 216 and 217, shown more particularly in Figs. 15, 17, 27, 31 and 36. These leaf boards are mounted on vertical extending supports 222, 223, 224 and 225 and running the length of the machine's conveyer chainway structure, said boards being of any desired height above the conveyers and preferably set obliquely in a transverse vertical plane for the purpose of properly accommodating the leaves and tobacco stalks as the severed plants are conveyed through the machine. These slightly tapered and downwardly trending leaf boards 216 and 217 are connected at their front ends to the leaf raisers 211 and 213 by suitable pieces 226 and 227 having outer convex surfaces and rolled edges to present surfaces to the tobacco plant which are least liable to injure the leaves thereof.

As a further precaution to protect the plant from injury during its passage through the machine there are provided suitable dirt shields, 215, preferably of sheet metal, which are shown more clearly in Figs. 35 and 36, although also disclosed in Figs. 15 and 17. Each of these shields is shown as having a downwardly curved surface 215ᵃ at the rear. It is to be understood, of course, that these dirt shields are provided with suitable apertures (not shown), through which are passed the supporting standards 222, 223, 224 and 225 for the leaf boards. The dirt shields may be suitably secured in position, such as by bolts to the parts 5 of the chainway structure, and also to the leaf raising points 211 and 213.

An idler gear 247 mounted upon a stud shaft 246 which is secured to the frame member 1¹. This idle gear 247 is adapted to mesh with a gear 245 which is mounted upon shaft 242 (see Figs. 2 and 17).

A power transmission shaft 248 is mounted in suitable bearings 251 and 252 which are secured to the frame members 1ʰ and 1¹, as shown in Figs. 2 and 31. This shaft 248 carries a spur gear 249 which is adapted to mesh with the idler gear 247, previously described. This shaft 248 is provided with a sprocket 253 fixedly secured thereto near the gear 249, and on the opposite side of the machine it is provided with another sprocket 254, as shown in Figs. 2 and 31.

Between the sprockets 253 and 254 are mounted the miter gears 30 and 31 on said shaft 248 (as shown in Figs. 2 and 34), which transmit motion to the shafts supporting the sprocket wheels 19 and 20, respectively, by suitable spur gears, as shown in Fig. 14. The sprocket wheel 254 is adapted to be connected to the smaller sprocket 79 for transmitting power and motion to the lath supply mechanism, (to be hereinafter referred to). An important feature of the invention resides in a primary stalk trip mechanism which is secured on the upper surface of the plate 4, and near the rear end thereof, as shown in Fig. 1, and more clearly in Fig. 21.

The basis of this primary stalk trip mechanism is an elongated plate 58, shown more particularly in Fig. 21 having an endless slot or roller course 58$^e$, see Fig. 22. A bar 59 is movably secured at its front end to the plate 58 by any suitable means, such as a bolt passed through the slot 58$^a$ and screwed into it from the under side. The bolt which secures this part 59 to the plate 58 is preferably of sufficient length to form means for securing a spring connection 59$^a$ to the bar 59, as shown. This bar 59 is freely mounted on the plate not only to slide as far as the length of the slot 58 will permit, but also to swing under limitations and governing parts to be hereinafter described. A guide loop 60 is suitably secured to the plate 58 and serves to provide a suitable guide for retaining the movable part 59 adjacent to the surface of the plate 58. A roller 59$^b$ is secured on the under surface of the bar 59, and so positioned to lie in the rectangular course 58$^e$ in the plate 58. Another roller 59$^c$ is secured to the upper surface of the part 59, preferably directly above the roller 59$^b$. The bar 59 is provided, also, with an adjustable finger 59$^d$, which protrudes into the path of the stalks, near the rear end of the spud and lath tube 42. A spring 63, preferably in the form of a coiled torsion spring is mounted on the plate 58 with its free end engaging the slot of the loop member 60, and retained in position by said member. The free end of this spring is adapted for swinging movement within the slot, while the other end of the spring is secured to the plate 58. A similar spring 62 has one end secured to the plate 58, similar to that of the spring 63, while its free end is limited in movement by a pin 58$^c$ carried by said plate. This spring 62 is adapted to exert energy in a direction the reverse to that exerted by the spring 63. These springs 62 and 63 are adapted to engage the roller 59$^c$ and direct the movement of the roller 59$^b$ through the rectangular course in said plate 58, for effecting the lateral releasing movement of the trip bar. A pull spring 61 has one end secured to a part 59$^a$ of the bar 59, while its other end is preferably secured to one of the brackets or supporting part 5 of the chainway structure. This primary stalk trip mechanism is connected in its movements with a secondary stalk trip mechanism disclosed more particularly in Fig. 23, and with a spacing mechanism shown in Fig. 46, to be hereinafter described, by a lever 109 which is shown in Fig. 1 as fulcrumed upon the plate 4, and which lever has a rearwardly extending rod 114 connected thereto. This lever and rod, when actuated by primary mechanism govern the movements of the secondary trip mechanism and the spacing mechanism simultaneously.

The inner end of the lever 109 is adapted to be engaged by the part 59$^a$ which is secured to one end of the rod 59, when said rod is pulled rearwardly by a stalk engaging its protruding finger 59$^d$ which normally extends transversely into the plant passage formed between the plates 3 and 4 of the frame. As will be understood, the stalks of tobacco are conveyed by the plant conveyers through this plant passage, into engagement with the tube 42, and on to a drying member or lath in alinement with said tube. This stalk trip mechanism, and its finger 59$^d$ are located at the rear end of the lath and spud tube 42.

The lever 109, just referred to, is provided with a spring 112 to retain it in its normal position to be engaged by the part 59$^a$. One end of this spring is secured to the outer chainway 53, while the other end of said spring is connected to the lever near its confined end thereof, said spring serving to return the lever to its normal position after having been released by the member 59$^a$.

The secondary trip mechanism disclosed in Figs. 2 and 23, is preferably secured to the frame member 1$^k$, as shown in Figs. 2 and 17. This secondary trip mechanism comprises a T-shaped plate 122, with the part corresponding to the top or cross of the T as the basis for supporting the mechanism, the other part or staff of the T serving to rigidly secure the mechanism to the frame member 1$^k$.

Referring more particularly to Fig. 23, this foundation plate 122 is shown provided with a narrow slot 122$^a$. On each side of the mechanism supporting section of the plate 122 is a thick rectangular block of metal 122$^b$, preferably formed integrally with the plate 122, or it may be detachably secured thereto. In each of these blocks of metal is provided a slide bearing shown in the form of a rectangular hole for a small size bar or slide piece 123, said bearings being formed adjacent the top surface of the plate 122 so that the under side of the slide bar 123 will engage the plate surface. This slide bar is provided with an upwardly extending lug 123ª situated between the bearings 122ᵇ, while at its rear end it is bent outwardly and provided with an aperture in which is secured the forward end of a rod 119, shown more clearly in Fig. 2. A hook 125, having a roller 125ª on one side thereof, is so pivoted to the lug 123ª of the slide piece 123, that its point is adapted to work through a slot 122ª in the plate 122. A bar 121 is secured to the device of the blocks of metal 122ᵇ, adjacent to the roller side of the hook 125. This bar 121 is provided with two rectangular recesses 121ª and 121ᶜ in the side thereof next to the hook 125, leaving an intervening neck of metal 121ᵇ between said recesses. This bar 121 is provided also with a leaf spring 121ᵈ having a downwardly bent end. Pivoted to the top of the bar 121 is a thin steel lever 124, one end of which is adapted to overlie the rearward recess 121ᶜ in the bar 121, while the other end thereof is provided with a slot to adapt it for proper connection with a pin block 114ª carried by the rod 114 (Fig. 2). To the top of the bar 121 is secured a limiting surface piece 120 adapted to engage the roll 125ª of the hook.

This secondary trip mechanism is preferably secured to the frame member 1ᵏ directly above the upper chainway 269 (Fig. 2) with the hook 125 lying in the same vertical plane with the center line of a small power transmission chain (not shown) which runs on the sprockets 111 and 253 of Fig. 2, and transmits power to the spacing mechanism to be hereinafter described. The chainway 269, just referred to, and another and similar chainway 270, are secured to the frame member 1ᵏ by connecting pieces 203 and 204, shown more clearly in Figs. 2 and 17, said chainways operating to support the longitudinal shields of the power transmission chains running on the sprockets 111 and 253.

Supported by the frame members 1ª, 1ᵍ, and 1ᶠ, is a bed plate 130, which is shown more clearly in Figs. 2 and 3 of the drawings, said plate being provided with a T-shaped rib or track extending substantially throughout its length. This rib and the edges of the plate 130 serve as a guiding means or track for the lath clutch and carrier, to be hereinafter described. The T-shaped rib 130ª has its upper part extending farther rearward than the plate 130 to which it is secured. It is preferred to remove a portion of this plate at the forward end thereof to facilitate the mounting of a small idler sprocket 133, carried by a stud pin 132, shown in Fig. 2. At the same end of the plate 130 is provided a stop pin 131, which is preferably rubber covered to cushion the impact of the forward movement of the lath end carrier.

Near the rear end of this plate 130, and preferably to its under surface, is secured an extra or special trip 127, shown more clearly in Figs. 2 and 42. Referring more particularly to Fig. 42, this extra trip mechanism is shown provided with a lug on its under surface to which is riveted a leaf spring 126ª. A trip lever 127 having a downwardly extending slotted projection to connect with the free end of the leaf spring 126ª, and a flat end by which it is engaged, is pivoted to the fixed member 126. This lever 127 is connected by a light chain 128 to a lever 129 pivoted to the under side of the frame member 1ᵏ (see Fig. 2). The outer end of the lever 129 is provided with a vertical slot through which extends a rod 119. Referring more particularly to Fig. 33, there is disclosed the lath end clutch and carrier which is adapted to ride upon the plate 130 of Fig. 2 and to be guided on said plate by contact with its rib 130ª. The carrier member or main part 135 of the lath end clutch and carrier is provided with grooves adapted to run on the edges of the plate 130 and with hooks engaging the rib 130ª to permit the part 135 to freely slide along said plate. This member 135 is provided, also, with rearward bearings 135ª and 135ª¹, a projection on 135ᵇ and a rearward extending horizontal arm 135ᶜ. This clutch carrier element is provided, also, with a fixed jaw 138 (Figs. 2 and 33), which is rigidly secured to the flat top piece of the main member 135, said jaw being provided with an upward obliquely set finger 138ᵇ and a horizontal finger 138ª. The inner surface of the jaw 138 and the top surface of the horizontal finger 138ª line up respectively, with the right side and the bottom of the lath tube 42. A short shaft 139 is mounted in bearings 135ª and 135ª¹ of the main member 135, and on the upper end of this shaft 139 is fixedly secured a horizontally swinging jaw 140. This jaw is preferably provided with a tooth on its inner surface which is adapted to contact with the fixed jaw 138 when in its closed position. A spring 142 is preferably secured on the shaft 139 between the bearings 135ª and 135ª¹ one end of the spring being secured to the main member 135, while the other end thereof is secured to the shaft 139. On the lower end of the shaft 139 is mounted a short arm 141.

On the under side of the rearwardly extending arm 135ᶜ is mounted a pair of rollers 143, (Fig. 33) and 144, (Fig. 17), which are adapted to engage the edges of the central rib 130ª of the plate 130. This arm 135ᶜ is provided, also, with a pair of hooks 135ᵉ which conform to the rib 130ª providing ample clearance, and insure the continuous retention of the rollers 133 and 134 in their proper horizontal plane of movement.

An arm 134 is secured to one side of the 130 member 135, and serves to slidably mount the rod 136. This rod 136 is provided with an eye at one end thereof adapted to be engaged by a cord 150 (Fig. 2) and is provided, also, with a spring 137 retained on the rod by a threaded nut 136ˣ to regulate the tension of this spring.

A trip rod 190 is slidably mounted in the frame, one end being supported in a hole drilled in the rear frame member 1ᶠ, while its front end engages a suitable piece of the frame near the member 1ᶜ. Near the front end of this rod 190 is an adjustable collar 191 (Fig. 2) which engages a spring 192 interposed between the collar and the frame member.

A short bar 145 (Figs. 2, 17 and 31) is adjustably secured to the top of the rear frame member 1ᶠ, said bar being provided with a roller 146 which is adapted to engage the arm 141 of the lath end clutch and carrier. For the purpose of spacing the stalks of the plants on the drying member or lath, to facilitate the circulation of air around the same, there is provided a suitably spacing mechanism shown at the rear end of Fig. 2 and disclosed more clearly in Fig. 46. This spacing mechanism comprises a frame secured by any suitable means upon the frame member 1ᶠ, as shown by Figs. 2, 13, 31 and 46.

The foundation of this spacing mechanism is a cast frame or housing 87, shown more clearly in Fig. 46. This frame is provided with two main bearings 87ᵃ and two downwardly extending lugs 87ᵇ serving as a bearing for a shaft 107. The frame member is provided, also, with a rearwardly extending surface 87ᶜ having bearings in its supporting ribs. A slot 87ᵈ near said rearwardly extending surface, and two inwardly extending surfaces 87ᵉ and 87ᶠ. On the right side of the frame 87, the shaft 90 engages directly with the bearing 87ᵃ, while on the left side of the frame, the bearing is made larger to have engagement by an extended sleeve 111ᵃ of the sprocket 111 (Fig. 48). This sprocket 111 with its inwardly extending sleeve 111ᵃ is freely mounted on the shaft 90 and retained in position by its hub abutting the frame 87, and also by a key (not shown) in the outer end of the shaft 90 for engaging the slot of the sleeve 111ᵃ. Slidably mounted on and splined to the inner end of the sleeve 111ᵃ of the sprocket is a pawl wheel 88 which is provided with a flanged hub and a deep semi-segment cut in its periphery. Pivoted on a flat plane, provided by the deep semi-segment cut, is a pawl 89 having two points, one to engage the teeth of the ratchet wheel 91, and the other to limit its movement by abutting engagement with the inclined or obliquely cut radial shoulder formed by the semi-segment cut. The pin on which this pawl is pivoted also carries a small torsion spring 89ᵃ, which has one end secured to the pawl 89, while the other end is anchored to the other end of the pin on which said pawl is pivoted. The inward extending sleeve of the sprocket 111 extends clear through the pawl wheel 88 to the ratchet wheel 91, which wheel is provided with teeth adapted to be engaged by the pawl 89 of the wheel 88.

Fixedly secured to the wheel 91 is a multiple cam 92, shown in the drawings as a triple cam having proper intervening spaces, although a quadruple or quintuple cam may be employed when it is desired to place more stalks on a lath. This wheel 91 and cam 92 are preferably fixedly secured to the shaft 90 mounted in said frame 87. A combined sprocket and clutch wheel 97 is mounted to rotate freely on the shaft 90 and is adapted to be retained in its position by a key (not shown) provided on each side of the wheel. This wheel 97 is shown provided with a flanged hub 97ˣ, formed separately therefrom, and is preferably riveted fixedly in place after the clutch pins 98, carrying suitable springs 99, have been inserted into holes formed in the sprocket 97, and corresponding holes in said flange 97ˣ. Any desired number of clutch pins may be employed, and each of said pins is formed with a fixed shoulder adapted to engage its spring in one direction and to limit its movement in the other direction by abutting the inside surface of the flange through which one end of the pin is adapted to slide.

Splined to the shaft 90 is a companion clutch wheel 100 which is also provided with an extended flanged hub 100ˣ, similar to the hub 88ˣ on the pawl wheel 88. This clutch wheel is shown provided with a series of circular accurately spaced holes drilled therethrough, said holes being of substantially the same size as the clutch pins 98. The spacing of the clutch pins on their circular center is varied from the spacing of the holes in the wheel 100 in such a manner that no two pins can enter holes of the said wheel 100 at the same time. The clutch, just described, is a very accurate one for catching the smallest fraction of a revolution, a feature considered desirable to the success of a machine of this character. Between the companion wheel 100 and the bearing 87ᵃ is mounted a press spring 101 on the shaft 90.

The frame 87 is provided with downward extensions 87ᵇ and 87ᵇ¹ forming bearings in which is mounted a shaft 107. A striker 108 is secured to the shaft, said striker being cam operated. A spring arm 106 is mounted on said shaft 107 between the striker 108 and the bearing 87ᵇ, said arm being connected to the frame 87 by a pull spring 110, through the medium of a terminal piece 105, shown more clearly in Fig. 2.

The striker arm 108 of Figs. 2, 17 and 46 is provided with a weight 108$^b$ at its upper end to give momentum to its movement under impulse of a spring 110 (see Fig. 2). This striker arm 108 is provided with a drilled lug 108$^a$ and also with a roller 118, which latter member is adapted to be engaged by the multiple cam 92.

A catch arm 93 is pivoted to the striker 108, as shown in Fig. 46, said arm being provided with a downwardly extending hook 93$^a$, a laterally extending surface 93$^c$ and an upward obliquely extended arm 93$^b$. The arm 93$^b$ is adapted to be connected to the lug 108$^a$ of the striker 108 by a small pull spring 94. At the rear end of the frame 87 is provided a short shaft or rod 116, which is mounted in bearing in the rearward extension 87$^c$, said shaft carrying, at one end thereof, a downwardly extending arm 115. At the other end of the shaft is mounted an arm 117 which operates in a slot 87$^d$ and is adapted to engage the laterally extended surface 93$^c$ of the catch arm 93.

A vertical detainer 95 is provided with a rounded portion on which is mounted a torsion spring 96. This detainer is provided with a laterally extending arm which terminates in a downwardly extended point. Said detainer 95 is pivoted to the inward extension 87$^e$ of the housing 87. The arm of said detainer is shown provided with an offset which is adapted to catch and hold up the catch arm 93 by its laterally extended surface 93$^c$, when the catch arm is raised by a lever 117 during the movement of the machine. A spring 96, having its upper terminal secured to the laterally extended arm and its lower end secured to the surface of the housing 87, supplies rearwardly directed force to the detainer 95. The detainer is prevented from swinging too far by abutting an end of the arm 117.

The lower free end of the arm 115 serves as a terminal connection for a rod 114 which connects with lever 109 of the primary trip mechanism and 124 of the secondary trip mechanism.

Pivoted to the top surface of the housing 87 is a triple arm lever 113. One arm 113$^c$ if said lever is adapted to be engaged by the downwardly extending hook 93$^a$ of the catch arm 93. A second arm 113$^d$ is provided with a pivoted semi-circular yoke 113$^b$ near its outer end, said yoke carrying a pair of rollers. The third arm 113$^a$ is provided with a hole, serving as means for connecting a rod 119, to be hereinafter referred to.

By reference to Figs. 2 and 46, it will be seen that the yoke arm 113$^d$, carrying the pair of rollers on the free ends thereof, is adapted to engage the wheel 88 and to move said wheel back and forth on a sleeve 111$^a$ of the sprocket 111 to which said wheel is splined. These rollers engage the wheel when the lever is moved in one direction and the flange of its hub when it is desired to move the wheel in an opposite direction, the rollers serving as anti-friction devices during the rotation of the wheel.

At the end of the arm 113$^a$ is preferably provided a block of metal 113$^e$ (see Fig. 2), which is elastically connected to the rear end of a rod 119 mounted to pass through said block. This rod is shown provided with collars 119$^a$, 119$^b$ and with a spring 277, mounted between said collars. The other end of the rod is secured to a slide piece 123 of the secondary trip mechanism, as will be more fully understood from an inspection of Fig. 2. A third collar 119$^c$ is secured to this rod intermediate the ends thereof, which collar is adapted to be engaged by the outer end of a lever 129 through which the rod 119 is passed.

Referring more to Figs. 2 and 46, there is shown a shifting lever 104 which is pivoted to the inward extension 87$^f$ of the housing 87. On one end of this lever is mounted a yoke 104$^a$ carrying anti-friction member 104$^c$, which are adapted to engage the wheel 100 and its perforated flange 100$^x$, as will be readily understood. The other end of this lever is provided with an upwardly projecting lug 104$^b$. A retaining lever 103 is mounted upon the housing 87, one end of said lever being connected to a rod 190, while the other end thereof is provided with a notch 103$^a$, which is adapted to engage the lug 104$^b$ of the shifter lever.

The two levers 103 and 104 serve to hold the wheel 100 out of engagement with the wheel 97, while the spring 101 operates to throw said wheel 100 into engagement with the wheel 97.

On the power transmission shaft 248, shown more clearly in Fig. 2, is mounted a sprocket 253 which is adapted to be connected to the sprocket 111, on the spacing mechanism, by a suitable sprocket chain (not shown). The upper and lower stretches of this chain are adapted to slide on supporting chainways 269 and 270, shown more clearly in Figs. 2 and 17, respectively.

This spacing mechanism, which has just been described, operates in conjunction with the lath end clutch and carrier, shown at 139 in Fig. 2, and more clearly in Fig. 33, in carrying out the spacing of the stalks of tobacco on the drying member or lath which is held in position by said lath end clutch and carrier. This spacing mechanism is connected to the clutch and carrier by means of an endless chain (not shown) running over the sprocket wheel 97 to the spacing mechanism, and the small idler sprocket 133, mounted near the end of the endless conveyers. The lower stretch of this sprocket chain is adapted to be secured to a stud bolt 135$^d$ (Fig. 31) on the left hand side of the lath end clutch and carrier.

Another important feature of the invention is the means for storing, and supplying drying members or laths to a charging position in the machine. One manner of accomplishing this result is shown more clearly in Figs. 36 and 37, as a lath hopper provided with a curved downwardly extending lath channel, which is preferably supported by a pair of braces 160$^a$ and 160$^b$. At the upper end of the hopper is provided a suitable framework having bearings 158 and 159, substantially in the center of each end thereof by which the hopper is pivotally mounted on a suitable framework. The upper end of the hopper is also provided with a suitable rod connection 195 adapted to be engaged by a rod 188. A laterally extending arm 163 is also secured to said hopper and is provided with a pivoted hook 164 for engaging the end of the swinging leaf member 220. The hopper is provided, also, with a short arm 161 adapted to be engaged by a rod 183 by which the hopper is moved on its pivoted bearings.

The hopper is preferably formed of sheet iron, and with a substantially angle steel rectangular frame at the top. The bottom of the curved lath channel terminates preferably in an angular steel member having a space sufficiently wide to permit a lath to pass with proper clearance.

To each end of the hopper channel's bottom is fixedly secured a lath dropper, shown more clearly in Figs. 30, 31 and 37. At a suitable distance from the front end of the bottom of the hopper is secured the lath catcher and guide 185 (see Figs. 32 and 37). A guide finger 273 is provided at the base of the hopper near the front thereof as will be seen from an inspection of Fig. 17. Suitable lath guiding fingers 201 and 202 are also provided at the ejecting end of the hopper, as will be understood from an inspection of Fig. 7. A vertical standard 154 (see Figs. 17 and 36) is secured to the rear frame member 1$^f$ and a bearing 157 is provided near the top of said standard.

The machine is provided with suitable foundation pieces 151 and 152, shown more clearly in Fig. 7. The foundation piece 151 is preferably formed of plate metal having one end rigidly secured to the end side of the base plate 130, while the other end is preferably secured to the side of a frame member 1$^h$. To this foundation piece 151 is rigidly secured another vertical standard 153, similar to the standard 154 in which is provided a bearing 156 near the top thereof, (see Figs. 17, 31 and 36).

Both of these standards 153 and 154 may be laterally braced in any suitable manner, the braces being omitted from the drawings to give a clear view of more important parts of the machine. These standards are the supporting members for the lath hopper 160 which is mounted to swing freely between them on a pair of short pins 162 and 165 (Fig. 17), connecting with bearings 156 and 157 of the standards 153 and 154.

These pins 162 and 165 are preferably keyed (as shown in Fig. 17) to retain the lath hopper, bearings and standard bearings against each other. The front standard 153 is braced in the direction of the machine's length by one end of the brace member 155 engaging the same, while the other end thereof is secured to the frame 1.

Referring more particularly to Fig. 30, it will be seen that the fixed part 171 of the lath dropper is so constructed as to facilitate its fastening to the lower end of the hopper channel. The pivoted part 175 of this member is provided with a limit arm 175$^c$, a resilient steel finger 175$^b$, and a rigid finger 175$^a$. One of these lath droppers is secured at each end of the bottom of the hopper channel, and each dropper is provided with a small pull spring 173 or 174, one end of the spring being attached to the pivoted part 175 or 176, while the other end of the spring may be attached to a fixed point on the hopper channel (see Fig. 37). These springs 173 and 174 cause the rigid fingers 175$^c$ of each pivoted part 175 and 176 of the lath hopper to lie across the channel's bottom or exit, while the spring steel fingers 175$^b$ are retained away from engagement with the holes 160$^c$ and 160$^d$ (Fig. 17) in the hopper channel through which they engage the laths in the hopper during the process of the operation of the machine.

Rigidly secured to the standards 153 and 154 are arms 179 and 180 which mount swiveled ended thumb screws 181 and 182. The swivels 181$^a$ of said thumb screws are connected to the pivoted parts of the lath droppers by suitable chains 177 and 178 of the proper length.

The lath catcher is shown in Figs. 32 and 37 as comprising a square bar 185 having a projecting spindle at the bottom thereof to mount a torsion spring 187. An adjustable piece 186, provided with a set screw 186$^a$, may be secured at any desired point on the bar 185. This spring 187 has one end thereof secured to the end of the spindle on which it is mounted, while its other end forms a flexible guiding finger 187$^a$. Referring especially to Fig. 36, although the part is also disclosed in Figs. 2, 17 and 31, it will be observed that on the rear end of the standard 154 is pivoted a substantial right angled lever 189, one arm of which is connected to member 195 at the top of the hopper 160 by a rod 188, while its other arm is connected to a horizontal rod 102. This latter rod 102, as will be observed from Fig. 2, is slidably mounted in a guide 193, the unconfined end of the rod being arranged to push an end of the lever 104 of the spacing mechanism.

As will be more clearly seen from Fig. 37, it will be noted that the hopper 160 is provided with a wide strap iron piece 199 on its angular outer surface, a part of said iron 199 serving as a path or guide for a lath agitator 200, shown more clearly in Fig. 39. This agitator serves to keep the drying members or laths shifted within the hopper in order that they may be fed through the lower neck of the hopper to the exit end thereof without being jammed in the passage way.

A foundation part 152, similar to the part 151, disclosed in Fig. 7, is secured at one end to the lower side of plate 130, while the other end of said part 152 is secured to the under side of the frame member $1^h$. Fixedly secured to the upper end of this part 152 is a U-shaped member 196 (see Fig. 2) in the vertical parts of which member are drilled suitable bearings (not shown).

The bottom end of the main part 200 of the lath agitator (Fig. 39) is pivoted in this U-shaped piece 196. A pair of rollers 197 is secured to one side of this lath agitator and adapted to roll on the path iron 199 of the hopper 160. At the upper end of the lath agitator is a bent rod 198 pivotally mounted, as shown in Fig. 39, which permits its adjustment with reference to the hopper. The rollers 197 are retained in engagement with the path iron 199 by a suitable press spring interposed between the short arm $200^a$ and the foundation piece 152. Rigidly secured to the bottom of the hopper, and preferably on one side of the channel (as shown in Fig. 31) are the two lath kicking arms 218 and 219.

These kicking arms are adapted to lift a lath or drying member full of spudded tobacco plants from its position in alinement with the plant passage of the machine, out of engagement with the lath and clutch and carrier and on to a suitable delivery platform 228, shown in Figs. 2 and 47.

This delivery platform is shown as a bent sheet iron member upon which the laths full of tobacco plants are adapted to be placed and to be directed to the outer end $228^d$ thereof from which they may be conveyed to the drier by any suitable means, or permitted to slide off on to the ground, if desired. When in position on the machine, this delivery platform is bolted, or otherwise secured to a few convenient points with the horizontal part $228^b$ thereof resting on top of the lower horizontal part of the traveling lath end clutch and carrier (Fig. 33) and its slightly turned up edge $228^a$ lying a short distance to the right of the machine's center. The portion $228^c$, of the greatest elevation of the platform, overlies a part of the frame member 1, and the transmission chainways 269 and 270, while the downwardly sloping portion $228^d$ is at the left of the machine and forms a termination of the platform.

Coöperating with the side of the lath hopper, is a swinging leaf board 220, shown in Figs. 17, 31, 36, and 38, to form a path for the upper portion of the tobacco plants between said leaf board and hopper, whereby the leaves may be protected from injury, as will be understood from an inspection of Fig. 36. This swinging leaf board 220 is hinged to the rear end of a left stationary leaf board 217, shown in Figs. 15 and 17, and the swinging leaf board 220 is provided with an outstanding arm $220^a$, shown more clearly in Fig. 38, and a horizontal rod $220^b$ terminating at the rear end of said board. As will be understood from an inspection of Figs. 17 and 36, this rod $220^b$ is adapted to be engaged by the pivoted hook 164 of the hopper to retain the swinging leaf board in operative position during the spudding or filling of the drying lath with tobacco plants. Secured to the rear end of the arm $220^a$ (see Fig. 17) is a long rod 221 which extends to the front of the machine, as shown in Fig. 15, where it is slidably secured to any convenient point. This rod is provided at its front end with a suitable handle $221^a$ within reach of the occupant of the seat 272, mounted upon the frame member $1^m$. This construction permits the operator to return the swinging leaf board 220 to a position to be reëngaged by the catch hook 164 of the hopper after the leaf board has been moved to its outward position to deposit a lath full of tobacco plants upon a conveyer platform 228.

The lath supply mechanism, shown at the upper side of Fig. 2, and more clearly in the perspective view of Fig. 43, operates in conjunction with the lath hopper of Fig. 37, the lath end clutch and carrier of Fig. 33, and other dependent and connecting parts, to carry out the function of ejecting a drying member full of tobacco plants from the machine and supplying a new lath in position to be filled with tobacco plants, as needed.

To support this mechanism, there is provided a twin bearing piece 274 (shown at the bottom of Fig. 36), which piece is provided with suitable bearings 69 and 70 shown at the upper portion of Fig. 2. This piece 274 is so secured to the lower side of plate 130 that its fastening to said plate will not obstruct the movement of the lath end clutch and carrier. In the bearing 69 of this twin bearing piece 274, and in a bearing 71 (shown in Fig. 31) secured to the frame member 1ʰ, is mounted the lath supply mechanism shaft 68. Adjacent the twin bearing piece 274 on the shaft 68 is freely mounted a large gear wheel 67 which has a lug 67ᵃ provided on its side. In the bearing 70 of this twin bearing piece 274 is mounted a short shaft 65, shown in Fig. 43, to the inner end of which shaft is fixedly secured a flanged pulley 64, while at the outer end of this shaft is a pinion 66 fixedly secured thereto and adapted to mesh with the large gear wheel 67. A circular guard 78 is preferably provided for the pulley 64, to protect the flexible member 150 from injury when said member is bound on the pulley. It will be understood that the pulley is provided with a suitable peripheral recess for the flexible member, as will be understood from an inspection of Fig. 44. The guard 78 may be retained in position by any suitable means, such as the arm 78ᵃ which may be bolted or otherwise secured to a standard 153. A pawl wheel 77 is fixedly secured on the shaft 68 next to the gear wheel 67. This pawl wheel is provided with a pawl 73 which is adapted to engage the lug 67ᵃ on the gear wheel 67 and to be retained in position to engage said lug under the impulse of a spring 74, although it is obvious that the lug may be so formed as to eliminate the necessity for the spring, if found desirable. A variable motion cam and pawl wheel 72 is fixedly secured to the shaft 68 adjacent to the frame member 1ʰ. The cam surface of this wheel 72 is so formed that it causes the proper swinging movement of the lath hopper 160, as indicated in dotted lines in Fig. 36. Referring more particularly to Fig. 31, there is shown provided an upstanding member 167, which is preferably secured to the frame member 1ʰ, on which member 167 is pivoted a lever 170. On the front end of this lever is preferably provided a roller 166, or other suitable anti-friction member, shown in Fig. 43 as adapted to ride upon and be engaged by the cam surface of the wheel 72. The rear end of this lever 170 is preferably connected to a short arm 161 of the lath hopper 160 by a rod 183 engaging a jointed member 184. A hooked pawl 75, shown more clearly in Fig. 45, is pivoted to the wheel 72 by a suitable stud pin.

A suitable ratchet wheel 84 (Fig. 43) which is adapted to move continuously during the operation of the machine is mounted on the shaft 68 adjacent the wheel 72. Fixedly secured to this ratchet wheel 84, and freely mounted on the shaft 68, is a small sprocket wheel 79, said ratchet 84 and sprocket 79 being held adjacent the wheel 72 by any suitable means, such as a key, not shown, through the shaft 68. This sprocket 79 is connected by a suitable endless chain (not shown) with the sprocket 254 carried by the power transmission shaft 248, as will be understood from an inspection of Fig. 2. In a suitable sliding bearing 82 (Fig. 43) secured to the part 151 and through a hole in said part 151 is slidably mounted a round piece 85, preferably provided with a flat side milled thereon to prevent said piece from turning in the slide bearing to which it is fitted. This slide piece 85 is shown provided with a roller 85ᵃ on its inner end which is adapted to engage the pawl 75, while the other end of this slide piece 85 is provided with an upstanding pin 85ᵇ. Pivoted on a bracket 148 is a double-armed lever 149, one end of said lever being positioned to engage the pin 85ᵇ of the slide piece 85 to pull said slide outwardly, while the other end of said lever is connected to a small trip lever 169 (Figs. 31 and 36) by a rod 147.

A small trip lever 169 (shown more clearly in Fig. 2) is pivoted to a bracket 168 secured to the rear frame memebr 1ᶠ. The free end of this trip lever 169 overlies an edge of the plate 130 and projects into the path of the lath end clutch and carrier when at its greatest distance from the endless conveyers. The engagement of the carrier and said lever operates to time the movement of the lath supply mechanism to furnish a new lath to the clutch and carrier. The lath supply mechanism (Fig. 43) is connected to the lath end clutch and carrier (Fig. 33) by a substantial flexible member or cord 150, as is shown in Fig. 2. One end of this cord 150 is secured to the flanged pulley 64, while the other end thereof is secured to an eye of the rod 136. At the upper left hand end of Fig. 2 is shown a bracket 80 for mounting a rearwardly extending roller 81, said bracket being bolted to the rearward side of the front lath hopper standard 153 in such a position that the roller 81 lies in the path of the arm 73ᵇ of the pawl 73 (Fig. 43). This roller is adapted to disengage one end of said pawl 73 from the lug 67ᵃ on the gear wheel 67.

An extending rib 72ᵃ and a hanging piece 83 on the wheel 72 operate to prevent the swinging of the lath hopper at an improper time under the impulse of an accidental jolt of the machine in passing over the ground.

The engagement of the pivoted hook 164 with the rear end terminal rod 220ᵇ operates to retain the hopper 160 and the swinging leaf board into substantial parallel relation during the period of filling the drying laths with tobacco plants.

Any suitable form of motive power may be mounted upon the member 1ᵃ and 1ᵇ of the frame, such for example, as an internal combustion engine, or an electric motor with storage batteries. The engine or motor, not shown in the drawings, is connected by suitable gearing to the large driving wheel 250, for the purpose of propelling the machine over the ground.

The gears 245 and 249, mounted adjacent said driving wheel, and coöperating therewith, are so proportioned with relation to the diameter of the wheel 250 as to drive the working parts of the machine at a slow speed. For example, the driving sprockets 19, 20 24 and 25, actuated by the transverse power-transmission shaft 248, operate to move the endless conveyers at substantially the same speed on the machine as that traveled by the machine over the ground, thereby preventing the breaking or unnecessary bending of the tobacco plants during the cutting and preliminary grasping operation at the front part of the machine.

The operator is seated at 272 where he can steer the course of the machine over the ground by the hand wheel 267 and can oversee the movement of its various parts. The machine is guided to advance on each successive row of tobacco to be harvested so that the standing stalks enter the machine's mouth between the points 211 and 213, the reciprocating cutter blade 237, which is mounted on the rapidly reciprocating frame 236 severs each stalk shortly after it has been grasped between the lower backward traveling conveyers and the forward pressing double arm conveyer lever 205. As will be understood, the cutter is free to travel with each stalk until it is completely severed, whereupon means are provided to instantly return the cutter to its forward position to attack the next stalk.

The lower conveyers are positioned a little in advance of the upper conveyers at the front of the machine. This arrangement of the lower conveyers, acting in conjunction with the forward pressing lever 205 serves to cause all stalks to enter the machine between the upper conveyers in a correct vertical position, whether or not they are standing upright when they enter the machine after they are cut off.

Immediately after entering between the stretches of the upper conveyer, the severed stalk is guided by the yielding guides 44 and 45 toward the sharpened end of a spud and lath tube 42, said guides directing the plant to be centered on said point to facilitate its attachment to a suitable drying member or lath carried by said tube. After the sharpened point $42^d$ has pierced the stalks, the upper and lower conveyers operate to pull the severed plant and stalk backwardly over said tube and onto a lath or drying member inserted at the rear end of the tube 42.

As previously stated, this spud and lath tube 42 is supported by the tits 282 of the links of the lower conveyer members 279, as is clearly shown in Fig. 28. This tube 42 is also held in place against spudding pressure by the automatic locking holders positioned on opposite sides of the plant passage, and shown in Figs. 1, 12, 28 and 29.

Each stalk, as it is drawn backward by the conveyers, engages the inner end of a locking member 12, causing it to swing on its pivot with a consequent disengagement of its lug $12^a$ from the holding surface of the plate lug 57 (see Fig. 29). The stalk is now free to push the holder 11 out of its path. As soon as the stalk has passed the position of the holder, said holder 11 flies back into retained positioned under the impulse of its spring 21, whereupon the spring 15 causes the locking member 12 to again engage the plate lug 57 for retaining the holder 11 in its locking position with the upstanding surface $42^a$ of the tube 42.

A number of these holders are preferably employed to retain this spud and lath tube in position, as part of the holders must necessarily be locked while others of said holders are permitting stalks to pass while in their unlocked position.

Assuming that the lath end clutch and carrier 135 is in engagement with a drying member or lath, holding the same within the tube 42, and that said clutch and carrier is moved to its forward position near the stop 131 on the plate 130, the movement of the machine over the ground operates to move the first stalk severed through the various steps just described to the rear end of the tube 42 and on to the lath by the conveyers. This first stalk is spaced at its proper position near one end of the lath by the arrangement of the mechanism which permits of a short space to be left on the drying member or lath near each end thereof for hanging the member to the proper shed rails of the drier.

At the time each stalk is pulled from the tube 42 on to the lath or drier and released by the diverging conveyers, at the rear end of the conveyer members, it engages the arm $59^d$ of the primary trip mechanism.

As previously described, this arm $59^d$ is mounted near one end of the sliding and swinging bar 59. When this bar 59 is pulled rearward by a stalk engaging its protruding arm $59^d$ (Figs. 2 and 21) energy is stored up in the pull spring 61 (Fig. 1) and the arm of the torsion spring 62 is engaged by the roller $59^c$, (Fig. 21). As the part 59 is being pulled rearward through the action of the stalk and conveyers, this roller $59^c$ pushes the arm of the torsion spring 62 out of its way, thereby storing up leftward directed energy in said spring. As soon as the roller $59^b$ reaches the backward limit or turning point of its course $58^e$, said spring causes the part 59 to fly leftward and the release of its arm $59^d$ from engagement with the stalk which caused the rearward movement.

As soon as the part 59 moves leftward under the impulse of the spring 62, the energy stored in the spring 61 causes the instantaneous return of the bar 59, during which return the roller 59$^b$ traverses the leftward long part of its rectangular course 59$^e$. During this return of the part 59, its upper roller 59$^c$ pushes the arm of the torsion spring 63 out of its way, storing up rightward directed energy in said spring 63. As soon as the roller 59$^b$ reaches the front limit or turning point in its rectangular course 59$^e$, the bar 59 is moved to the right and into its normal rest position with the consequent protrusion of the arm 59$^d$ into the plant passage ready to be again acted upon by a stalk and pulled rearward.

Referring more particularly to Figs. 1 and 2, when this bar 59 is pulled rearward by the passing stalk, as just described, the member 59$^a$ engages one end of the lever 109, rocking said lever on its fulcrum and causing a forward movement of the rod 114 with a consequent storing of energy in spring 11z.

The forward movement of this rod 114 not only rocks the lever 124 of the trip mechanism in the direction indicated by the arrow in Fig. 23, but also raises the catch arm 93 upwardly, where it is held for a moment by its laterally extending surface 93$^c$ resting upon the offset 95$^a$ of the vertical detainer 95.

This raising and holding up of the catch arm 93 throws its hook 93$^a$ out of the plane of movement of the lever 113. When the lever 124 of the secondary trip mechanism is rocked on its fulcrum, the other arm of said lever swings outwardly from under the roller 125$^a$ and permits the hook's point to drop through the slot 122$^a$ (Fig. 23). This end of the lever 124 normally overlies the rearward recess 121$^c$ of the bar 121 and operates to support the hook in its upper or rest position. When the hook drops through the slot 122, its point moves into the path of the upper forward traveling stretch of a continuously moving power transmission chain sliding in the chainway 269 of Fig. 2. This chain (not shown) transmits power and motion from the sprocket 253 on shaft 248 to the sprocket 111 on the spacing mechanism. Having dropped into connection with this traveling chain, the hook 125 and sliding piece 123, to which it is pivoted, are pulled forward, causing the triple arm lever 113 of the spacing mechanism to be rocked on its pivot, through the medium of the rod 119. This action of the rod 119 moves the lever 113 so that its yoked arm 113$^d$ shifts the wheel 88 of the spacing mechanism along the sleeve 111$^a$, of the sprocket 111, toward and against the ratchet wheel 91. The wheel 88, coming against the wheel 91, forms a limit of movement of the lever 113.

As previously described, the bar 59 returns instantly to its normal position after it engages and rocks lever 109. Likewise, the lever 109, being only momentarily engaged by the part 59$^a$, returns instantly to its position of rest under the impulse of the spring 112. The instant returning of the lever 109 causes the small lever 124 of the secondary trip mechanism, and the parts 115, 116 and 117 of the spacing mechanism to also return to their normal or rest positions, through the medium of the rod 114. It is understood that the lever 124 is also swung back to its position of rest with its end overlying the rearward recess 121$^c$ of the bar 121.

When the hook 125 and slide piece 123 are pulled forward by the continuously moving transmission chain from sprockets 253 to 111, the roller 125$^a$ runs in between the downwardly bent end of the leaf spring 121$^d$ and the neck of metal 121$^b$ formed on the bar 121, thereby forcing said spring 121$^d$ downwardly. This action stores up energy in said spring and forces the hook 125 to fly upwardly and its point to be disengaged from the transmission chain, as soon as the roller 125$^a$ reaches the forward recess 121$^a$ in the bar 121. The upward throw of this hook is checked or limited by this roller 125$^a$ engaging the undersurface of the part 120. As this roller 125$^a$ is now above the front point of the neck of metal 125$^b$ and free to permit the return of the hook 125 and bar 123 to their normal position, the spring 277 causes the partial return of said hook 125 and slide bar 123, leaving said bar upheld by its roller 125$^a$ resting on the neck 121$^b$.

The spring 277, forming the resilient connection of the rod 119 with the triple lever 113, caused this partial return of the hook 125 and bar 123 because the amount of forward movement of the bar 123 exceeded somewhat the amount of movement required to rock the lever 113 to its limit, and this excess movement was consequently taken up and stored energy in said spring.

The raising of the catch arm 93 of the spacing mechanism by the connection of the primary trip mechanism through the lever 109 and rod 114, together with it being momentarily retained in an upward position by its laterally extending surface 93$^c$ engaging the offset 95$^a$ of the detainer, are primary actions which necessarily immediately precede the rocking of the lever 113.

If this catch arm 93 was not raised and held up immediately preceding the rocking of the lever 113, the hook 93$^a$ abutting the arm 113$^c$ would not permit the free rocking of the lever 113, since the force of the spring 110 carried by the arm 106 on the shaft 107 would be directly opposed to the force of the movement supplied to this lever 113 by said sliding piece 123, and would cause a premature disengagement of the wheels 88 and 91. This catch arm 93 occupies, at all times, the downward position shown, except during the moment immediately preceding the rocking, and the movement of rocking of the lever 113, as its hook must hold said lever to prevent the engagement of the wheel 88 at an improper time. The shifting of the wheel 88 against the wheel 91 causes the pawl 89 of said wheel 88 to engage one of the teeth of the wheel 91. As the wheel 88, together with the sprocket 111, revolve continuously, this engagement of the wheel 91 by the pawl 89, will cause said wheel 91 to revolve in unison with the wheel 88. The triple cam 92, secured to the wheel 91, operates to swing the striker 108 rearwardly through the medium of the roller 118 until said roller reaches a point of one of the three cam arms, producing this movement. As soon as the roller passes the point of said cam arm, said roller is free to return to its former position and abut the next successive cam surface ready for a similar movement. When the striker 108 is swung rearwardly, energy is stored up in spring 110 which operates to return said striker as soon as the roller 118 passes the point of the cam arm, as just described. When the striker 108 swings rearwardly, its catch arm 93 which was held upwardly by the lateral extension 93$^c$ lying on the offset 95$^a$ of the detainer, is released from its engagement therewith, and is permitted to move down under the impulse of the spring 94, permitting the point of its hook 93 to slide on the rearward extension 87$^c$ of the housing 87 during the swinging movement of said striker arm 108.

The hook 93$^a$ of the catch arm 93 being again positioned in the path of the arm 113$^c$ of the lever 113, is permitted to apply forward striking force of the striker 108 to said arm 113 and cause it to be rocked back on its pivot point into its former position, resulting in the disengagement of the pawl 89 of wheel 88 from the wheel 91.

When the lath end clutch and carrier darts to its front limit of movement under the impulse of the lath supply mechanism, and causes the insertion of a lath into the tube 42, ready to receive the stalks of tobacco, this carrier engages the collar 191 mounted on the slidable rod 190, which passes through the lug 135$^b$. This action of the carrier pushes the collar 191 and its rod 190 forward, storing up energy in a spring 192. It will be observed that the lath end clutch and carrier is stopped in its forward movement at the correct point a little after it engages said collar 191 by the cushioned pin 131 on the bed plate 130. This forward movement of the rod 190 rocks the lever 103 of the spacing mechanism and causes its notched end to release its hold upon the upstanding lug 104$^b$ on the end of the shifter lever 104. As soon as this lever is released, the spring 101 on shaft 90 is free to act and operates to push the wheel 100 into engagement with the sprocket and clutch wheel 97, as will be understood from an inspection of Fig. 46.

The engagement of these two wheels 97 and 100 connects the lath end clutch and carrier with the ratchet wheel 91 and the multiple cam 92. The said wheels 91 and 92 are suitably secured to the shaft 90, the wheel 100 being splined to said shaft, as heretofore described. The stud bolt 135$^d$ (shown in Fig. 31), mounted under the left edge of the plate 130 and secured to the lath end clutch and carrier, is connected to the lower stretch of the small endless chain (not shown) which is adapted to be driven by sprocket 97. With this lath end clutch and carrier thus connected to the sprocket wheel 97, it receives a certain amount of backward lineal movement as a result of a fraction of a revolution of the wheel 91. In the embodiment of the invention disclosed, the wheel is given a third of a revolution and this fraction of movement received by the wheel 91 between its engagement and disengagement with the wheel 88 is determined by the number of arms in the multiple cam 92—shown in the drawings as a triple cam.

All these movements of the primary trip mechanism, secondary trip mechanism, the spacing mechanism, and the lath end clutch and carrier, take place in very rapid succession and are repeated for each stalk. It is usual to plant tobacco stalks about two to three and one-half feet apart. For each stalk engaged, there is a certain amount of backward lineal movement of the lath end clutch and carrier.

These successive, alternate, rearward, lineal movements of the lath end clutch and carrier, which gradually draw the lath from the tube 42, cause the stalks to be accurately spaced on said lath for the reason that simultaneously with the pushing of each stalk from the rear end of the tube 42 on to the lath, the series of movements just described takes place, and causes the lath to be pulled out of the tube for a predetermined distance ready to receive the next arriving stalk. When the last stalk has been placed upon a lath and the rearward movement of said lath end clutch and carrier is about finished, the part of said clutch and carrier which runs along the left edge of the plate 130 has at that time engaged and rocked a small trip lever 127 against the energy exerted in the leaf spring 126$^a$.

This lever 127 is connected by a shaft or chain 128 to the level 129, and the rocking of said lever 127 by the lath clutch and carrier operates also to rock said lever 129. It will be understood that lever 127 is held for a short interval of time, sufficient to enable the engaging surface of the clutch and carrier to pass said lever. This resultant action of lever 129 causes its outer end to engage the collar 119ᶜ carried by the rod 119, and thereby restrain the rearward movement of the rod 119 which otherwise would occur at that moment, resulting in the disengagement of the wheel 88 from the wheel 91. This prevention of disengagement of said wheels from each other, causes the wheel 91 to turn an extra fraction or fractions of a revolution, as may be found necessary, with a corresponding extra or blank movement of the lath end clutch and carrier. At the termination of this blank movement, the wheels 88 and 91 are disengaged in the regular manner as the lath end clutch and carrier (in traveling this last or blank space of its rearward movement) passes out of reach of the lever 127 and thereby releases the lever 129 from its restraining position.

One object of this blank movement of the lath end clutch and carrier is to draw the lath full of tobacco farther to the rear end of the machine, so that the front end of this lath, which would otherwise be obstructed by the curved rear end of the left dirt shield 215 (Fig. 15) will be enabled to clear said dirt shield when the lath filled with tobacco is ejected from the machine.

As the lath end clutch and carrier completes its blank movement, its arm 141 abuts against the roller 146 on member 1ᶠ at the rear end of the frame, thereby causing the swinging jaw 140 of the carrier to move away from the fixed jaw 138 thereof for the purpose of releasing the lath from engagement with the carrier.

At substantially the same period of time, or during the finish of the spacing movement of the clutch and carrier, the right side of the part 135 is adapted to engage and rock a small trip lever 169. This action through the medium of the rod 147 operates to rock the lever 149 upon its fulcrum. The rocking of this lever 149 operates to pull the slide piece 85 (Figs. 2 and 43) outwardly by means of the pin secured on the outer end of said slide. When this slide piece 85 is moved to its outward position against the action of the spring 86, its inner roller carrying end 85ᵃ is drawn away from the roller fitting terminal of the disengaging arm of the pawl 75, permitting the leaf spring 76 to cause the hook end of said pawl 75 to engage the continuously revolving ratchet 84. It will be remembered that this hook pawl 75 has been held out of engagement with the ratchet wheel 84. When this pawl 75 is made to engage the continuously revolving ratchet wheel 84, the variable motion cam and pawl wheel 72, to which it is pivoted, is caused to revolve. As soon as this wheel 72 starts to revolve, the lath hopper 160 (Fig. 37) begins to turn upon its pivots or swing to the position shown by the dotted lines in Fig. 36, under the impulse of the action of said cam against the roller 166 on the lever 170. When the hopper 160 begins its swinging movement, the pivoted hook 164 (Fig. 36), carried by its laterally extending arm 163, is caused to release its holding upon the swinging leaf member 220, permitting the latter to immediately swing outward to the left. It will be remembered that this leaf board 220, and the inner or left surface of the hopper 160, serve to retain the tobacco erect until the lath is filled with the plants. The variable motion cam surface of the cam and pawl wheel 72 is so constructed that the hopper 160 is swung to the limit of its movement during approximately the first one hundred and twenty-two degrees of the cam's revolution. The hopper remains at that limit during approximately the next ninety degrees of the cam's revolution, thence swings backward about half way during the next sixty degrees of revolution of the cam and remains at its half way position during approximately the next seventy-two degrees. During the final sixteen degrees of movement of the cam, the hopper is swung to its rest position, ready for the next supply movement thereof.

When the lath hopper 160 is thus operated or swung to the positions as just described, the lath kicker arms 218, 219 (Figs. 17 and 31) secured to the lower end of its channel, operate to push the lath full of tobacco out of the way and toward the left, causing said lath to be moved on to the delivery platform 228 from which it may be conducted to a drying rack or moved to a suitable conveyer, or, if desired, permitted to be dropped upon the ground to be collected.

When the lath hopper 160 has been swung to its limit the center of the lower part of its channel is approximately in the vertical central plane of the machine. The inner surfaces of the spring finger 187ᵃ (Figs. 32 and 37) and inner side of the part 185 of the lath catcher and guide are substantially in alinement with the sides of the lath tube 42, supposing said tube to be made rectangular in cross section, as shown in Fig. 17. When the hopper 160 swings, as just described, it rocks the lever 189 (see Figs. 2, 31 and 36) through the medium of the rod 188, and this rocking of lever 189 which is connected by a rod 102 to lever 104 causes the rocking of said lever 104 of the spacing mechanism.

The rocking of this lever 104 again disengages the wheel 100 from wheel 97, and this lever 104 is retained in the disengaging position by its lug 104ᵇ secured within the notch of the lever 103. This lever 103 acts to lock lever 104 in the disengaging position under the impulse of spring 192 carried by rod 190 (Fig. 2).

As the center of the bottom of the lath hopper's channel arrives in the central vertical plane of the machine, the pivoted part of each of the lath droppers 175, 176 (Figs. 30, 31 and 37) is rocked to its limit by the chains 177 and 178, respectively, which become tight a little before the hopper arrives at its central vertical position.

As will be understood from an inspection of Figs. 31 and 36, these chains normally hang slack when the hopper 160 is in its rest position, and as their lengths are so adjusted that they become tight a little before the arrival of the channel bottom in lath dropping position, that is, in the vertical central plane of the machine, the rocking of the pivoted parts 175 and 176, and the storing of energy in springs 173 and 174 must result during the final movement of the hopper 160.

When the pivoted parts 175 and 176 are rocked, their lower fingers swing from under the exit of the channel, permitting the lowermost of the laths, which were resting on said fingers, to drop, while the spring arms, (such as 175ᵇ of Fig. 30) swing their points into the holes 160ᶜ and 160ᵈ (Fig. 17) and operate to hold up all the remaining laths in the hopper. This action permits one lath, and only one, to be supplied at a time.

When a lath is dropped from the hopper channel by the aforesaid action of the lath droppers, the rear end thereof is guided to fall upon and rest on the horizontal finger 138ᵃ, (Fig. 2) of the fixed jaw 138 of the lath end clutch and carrier, while its front end is supported and held edgewise in the lath catcher 186 (Fig. 37) the fixed part 185 of which hangs substantially vertical when the hopper 160 is at this limit of its movement.

When the lath supply mechanism caused the insertion of the lath into the tube 42 at the start of the machine (which lath is now supposed to have been covered with plants and kicked off) the disengaging arm 73ᵇ (Figs. 43 and 45) of the pawl 73 was engaged by the roller 81. This roller is on the rearward side of the front standard 153 and causes the said pawl 73 to be rocked on its pivot, and its point 73ᵃ to be disengaged from the lug 67ᵃ on the gear wheel 67 (Fig. 2). This disengagement of the point of the pawl 73 from the lug 67ᵃ occurs at the finish of the revolution of the wheels 72 and 77. The disengaging arm 73ᵇ of the pawl 73 is of such length that it remains against the roller 81 after the wheels 72 and 77 have stopped, and during their period of rest, thereby retaining the wheel 77 in its disengaged position from the gear 67. It will be understood that the lath end clutch and carrier has been moved to its front limit ready to begin its backward spacing movements. If this disengagement, just referred to, did not occur, the said clutch and carrier, which landed at the front of its track simultaneously with the disengagement, would be locked and prevented from its step by step rearward movements under the impulse of the spacing mechanism. In like manner, should the wheels 97 and 100 of the spacing mechanism not be disengaged by the leftward swing of the hopper, (as previously described through the medium of the rod 188, lever 189, rod 102 and lever 104) the said lath end clutch and carrier would be locked at its rear limit and prevented from moving to its front limit.

In connecting the lath end clutch and carrier to the pulley 64, one end of the cord 150 is so secured to the flange pulley 64 that when it is wrapped on or unwrapped from said pulley, it is coincident with a tangent of the lower face of the pulley's circumference. It will be understood that the other end of this cord is secured to an eye provided on the rod 136 of the lath end clutch and carrier. Therefore, when looking at the machine from the right thereof, the spacing movements cause the lath end clutch and carrier to travel from the front to the rear limit of its movement, the cord 150 being forced to unwrap from the pulley 64, the said pulley revolving in a clockwise direction. This action of the pulley 64 causes the gear wheel 67 to revolve in a counterclockwise direction through the medium of the pinion 66. The length of the cord 150, the diameter of the pulley 64 and the proportion of the gears 66 and 67 should be such that gear wheel 67 will be caused to revolve in counterclockwise direction about a half revolution during the complete unwinding from the pulley 64. This unwinding of the cord 150 occurs during the passing of the lath end clutch and carrier from its forward position to its rear limit under the impulse of the spacing mechanism.

The reversing movement of the gear 67 brings the lug 67ᵃ, on the surface thereof, substantially diametrically opposite to the position it occupies the moment the movement of the wheels 72 and 77 ceases. This lug 67ᵃ is freed from engagement with the point of the pawl 73 simultaneously with the arrival of the lath end clutch and carrier at its front limit.

After a lath drops from the hopper channel on to the horizontal finger 138ᵃ of the fixed jaw 138 (Figs. 2 and 33) and also on to the adjustable piece 136 (Fig. 37) of the lath catcher, the pawl 73 should immediately engage the lug 67ª on the gear wheel 67 in its reversed position, and cause the said gear wheel 67 to revolve in a clockwise direction, looking from the right of the machine. It will be recalled that the lug 67ª, to accomplish this purpose, is almost diametrically opposite the position it occupies when the pawl 73 is disengaged from it.

When the gear wheel 67 is started revolving in clockwise direction, with the consequent revolving of the pulley 64 in counterclockwise direction, the cord 150, swinging on the pulley 64, moves the lath end clutch and carrier in its forward direction. As said clutch and carrier is leaving its rearward limit, the pivoted jaw 140 (Fig. 2) is set free on account of the arm 141 passing away from the roller 146 and said jaw is thereby permitted, under the impulse of spring 142, to grasp the rear end of the lath between it and the fixed jaw 138.

The drying member or lath is preferably pointed at only one end and is adapted to be inserted into the rear end of the lath tube 42. The lath is retained in the lath end clutch and carrier between the jaws thereof, as will be understood. When said carrier is moved forward with the top of its fixed horizontal finger 138ª, and the top of the vertically adjustable piece 186 of the lath catcher (Fig. 32) in alinement with the inside surface of the lower edge of the lath tube 42, the forward traveling lath is guided into said tube's rear end by said lath catcher and guide. The guides 34 and 35, pivoted on the conveyer chain structure (Fig. 2) also assist in this operation.

When the lath end clutch and carrier leaves its rear limit, it sets free the small trip lever 169 (Fig. 2) and permits said lever and the lever 149 with the slide piece 85, to return to their former positions under the impulse of the leaf spring 86. The small trip lever 127, positioned nearly opposite to the lever 169, permits the left extremity of the lath end clutch and carrier to pass the same in either direction, the forward movement of said clutch and carrier merely effecting the mechanism by slackening the chain 128 for a moment.

After the point of the lath enters the rear end of the tube 42, as previously described, the first decline surface of the variable motion cam 72 (Figs. 2 and 43) reaches the roller 166 and as a consequence the hopper is permitted to gradually and quickly swing back half way so that the lath catch (Fig. 32) will be out of the path of the rapidly advancing lath end clutch and carrier. It will be understood that the lath catch and guide, (Fig. 32) is carried by the lath hopper 160.

When the lath hopper swings back half way, as just indicated, the spring finger 187ª of the lath catcher, moves out of connection with the forward traveling lath which it has guided into the tube 42. Also, when said hopper 160 begins the first half of its return movement, the pivoted parts 175 and 176 of its lath droppers swing back into their position of rest under the impulse of springs 173 and 174, said parts being set free by the slackening of the chains 177 and 178. The points of the spring steel arms, 175ᵇ and 176ᵇ swing out of their lath supporting position and through the holes 160ᶜ and 160ᵈ in the hopper's channel, thereby permitting all the laths in the channel to work downwardly, so that the lowermost lath will rest on the lower or rigid arm ready to be dropped when the lath dropping movements are repeated.

The hopper remains in this half way position until the beginning of the steep short decline surface of the variable motion cam comes under the roller 166 (Figs. 2, 31 and 43) when said hopper is permitted to swing back quickly to its position of rest. As the wheels 72 and 77 of the supply mechanism are about to complete their revolution, the disengaging arms 73ᵇ and 75ᵇ of the pawls 73 and 75 simultaneously come against the rollers 81 and 85ª and cause the disengagement of the pawl 75 from the ratchet wheel 84, and the disengagement of the pawl 73 from the lug 67ª on gear wheel 67 under the impulse of the several wheels momentum and the force exerted by the roller 166 against the wheel 72 as it rolls down the steep short decline surface of the cam to its position of rest. It will be understood that the force exerted on the several wheels is partially caused by the weight of the hopper.

During the time intervening the engagement between the lugs 67ª by the pawl 73, and its disengagement from it at the completion of the revolution of the wheels 72 and 77, the lath end clutch and carrier is caused to move quickly from its rear position to its front limit by the winding up of the cord 150 upon the pulley 64. As before described, when said clutch and carrier arrives at its front limit, it strikes the collar 191 on rod 190 (Fig. 2), causing the notched end of the lever 103 to release its holding upon the lug of the lever 104, with the consequent reëngagement of the wheels 100 and 97 of the spacing mechanism.

Like the movements which carry out the spacing function, these lath supply movements are very rapid and are all repeated for every lath supply from the hopper 160 to the tube 42.

When the wheels 100 and 97 of the spacing mechanism are thrown back into connection, as just described, the spacing movements of the lath are instantly resumed and all the operations described of ejecting the lath, supplying a new one, return of the hopper, and the like, are repeated.

As soon as the lath hopper swings back to its position of rest, the operator of the machine pushes the rod 221 to a backward position, causing the swinging leaf board 220 to move parallel to the hopper 160 where it is held during the rest interval of the lath hopper by the latch or pivoted hook 164 on the arm 163 carried by the hopper. It is understood that during this rest interval of the hopper, the lath is being covered with tobacco plants properly spaced thereon.

The lath agitator (Figs. 31 and 39) whose rollers 197 are kept against the path iron 199 on the hopper 160 by a spring between its short arm 200ª and the piece 152, swings on its pivot, when the hopper 160 swings, and causes its rod terminal 198 to shuffle the laths in the hopper 160 sufficiently to cause them to enter and settle down into the hopper's channel.

It will be seen, therefore, that the machine is directed in its movements across the field so that the growing plants will enter the mouth of the machine between the leaf raisers 211 and 213, and that the low horizontally positioned catcher 237 will engage the stalk of the plant near the ground. Before the plant can be completely severed, it will be seized by the forwardly extended conveyers 6 and 7 and conducted through the central plant passage of the machine. Should the plants be in a position other than substantially the vertical, the companion lever 205 which coöperates with the cutter and lower conveyers, will operate to bring the plant to an upright position, whereupon the severed plant will be guided between the yielding guides 44 and 45, seized by the links of the upper conveyer, where the stalk of the plant will be brought into alinement and centered on the point of the spudding tube 42. The plant will then be perforated and threaded on said tube and carried by the upper and lower conveyers to the end of said conveyers, where it will be deposited upon a suitable drying member or lath held between the lath end clutch and carrier 135 and the lath tube 42. During this rearward movement through the plant passage, the stalk will successively engage the various tube holders 8, 9, 10 and 11, the locking means, etc., as previously described, and move them out of position temporarily during the passage of the stalk. Near the end of the conveyers, the plant will engage the arm 59 of the primary stalk trip operating the primary stalk trip mechanism, the secondary stalk trip mechanism, and the spacing mechanism as a result of said engagement, moving said lath a step farther to bring the newly impaled stalk to its proper engagement on said lath out of engagement with the stalks which have been previously placed thereon. When the lath has been moved by its step by step movement toward the rear end of the machine, and the lath filled with its tobacco stalks, the trip lever 169 is operated, together with the various safety levers 127, 129 and 113, and the kicker arms are operated to swing said filled lath from its position in the plant passage over the intervening mechanism and on to the delivery platform 228 from which it can be moved to a suitable drying rack. This movement of the lath kicker is immediately followed by the movement of the hopper to supply a fresh lath in position, the quick return of the lath end clutch and carrier to its forward position, forcing the new lath into the tube 42 ready to be filled with tobacco stalks to be placed thereon, as in the case of the one just removed.

Having thus fully described our invention, what we claim as new and desire to secure by Letters Patent is:—

1. In a harvesting machine, a traveling main frame, stalk severing devices carried thereby, an impaling needle permanently carried on the frame, means for automatically moving a series of laths one at a time into registry with said needle, and means for transferring the impaled stalks from the needle to the lath.

2. In a harvesting machine, a traveling main frame, stalk severing means carried thereby, a removable support upon which the stalks are collected, an impaling needle extending from the severing devices to the removable support upon which the stalks are automatically impaled, and means for automatically shifting the impaled stalks throughout the length of the impaling needle onto the removable support.

3. In a harvesting machine, a traveling main frame, stalk severing devices carried thereby, an impaling needle permanently mounted on the frame and extending to a point adjacent to the severing means, means for shifting the impaled stalks throughout the length of the impaling needle, a removable lath forming a continuation of the impaling needle upon which the impaled stalks are collected, and means for automatically moving the lath into and out of registry with the needle.

4. In a harvesting machine, a traveling main frame, stalk severing devices, a needle upon which the stalks are to be impaled, a guide for the stalks fixed in relation to the needle, means for pressing a stalk into engagement with the guide, said guide being so located in relation to the needle that the stalk will be centered in relation to the needle causing the stalk to be engaged thereby on substantially the medial line of the stalk, 5. In a tobacco harvesting machine, a traveling main frame, stalk severing devices carried thereby, a support upon which the stalks are to be impaled, gripping devices adapted to automatically engage the butts of the severed stalks and while continuing to firmly engage the butts of the stalks to forcibly thrust them upon the support whereby they will be impaled thereby.

6. In a tobacco harvesting machine, a traveling main frame, stalk severing mechanism, a removable support upon which the stalks are to be impaled, impaling devices adapted to cause the support to be projected through the stalk, and means for automatically discharging the support when a predetermined quantity of stalks have been engaged thereon.

7. In a tobacco hanger, a main frame adapted to carry a plurality of removable supports upon which the plants are to be engaged, means for automatically advancing the supports singly to receiving positions, means for automatically impaling the plants thereon, and means for automatically discharging the support for attached plants when a predetermined quantity of plants have been engaged therewith.

8. In a harvesting machine, a main frame having severing devices thereon, conveying mechanism, movable supports for the severed stalks, means for advancing the supports singly to position to receive the stalks, means for automatically centering each individual stalk in alinement with said support, means for securing the severed stalks thereon, and means for discharging the support when a predetermined quantity of stalks have been attached thereto.

9. In a harvester, a traveling main frame having means whereby the plant is cut, means to convey the plant in an upright position, means to impale the plant in such position, and means to convey the impaled plant to a lath.

10. In a harvester, a traveling main frame, an impaling needle carried by the frame, a lath coöperating with the impaling needle, and means to automatically space the impaled plants on the drying lath.

11. In a harvester, a traveling main frame, removable drying and supporting members carried by the frame, an impaling needle, means for feeding said drying and supporting member successively in the rear of said impaling needle to coöperate therewith in receiving plants automatically transferred from the needle to a drying and supporting member, and means to automatically transfer the impaled stalks of the drying and supporting members from the traveling main frame.

12. In a harvester, a traveling main frame to carry a plurality of removable supports, an impaling needle, means to automatically advance a support singly into position to receive plants to be impaled, and means for intermittently moving said supports while in coöperative position to the impaling needle for the purpose of spacing the plants upon said support.

13. In a harvester, a traveling main frame having means to sever a growing plant, means to hold the plant in an upright position while securing the severed plant upon an impaling device, a removable drying support coöperating with said impaling device, and means actuated by contact with a plant for intermittently moving the drying support on the frame for the purpose of spacing severed plants thereon.

14. In a harvester, a plant cutting mechanism, an impaling implement, a removable drying member coöperating with the impaling implement, and means operating automatically whereby said drying member may be positioned into alinement with the impaling implement, and means for conveying plants from the cutting mechanism into engagement with the impaling implement to be transferred to the drying member.

15. In a harvester, a traveling main frame, an impaling implement secured to the frame, a chambered plant engaging member coöperating with the impaling member, means to supply removable drying and supporting members to the frame into alinement with the impaling implement and to be telescopically engaged by the chambered plant engaging member, and means to automatically move said drying member to space severed plants thereon.

16. In a harvester, a traveling main frame, an impaling implement mounted thereon, a chambered plant engaging member positioned in alinement with the impaling member, means to position removable drying members into alinement with the impaling implement and to have said drying member extend into the chamber of the plant engaging member, and converging means in coöperative relation to the drying member and impaling member to direct the movement of severed plants to the impaling implement whereby said severed plants may be thereafter transferred to the drying member in an upright position.

17. In a harvester, a traveling main frame, an impaling implement carried thereby, a chambered plant engaging member forming a continuation of the impaling implement, a drying member adapted to have telescopic engagement with the plant engaging member, means to automatically move said drying member relative to said chambered member, and conveying means to transfer plants from the impaling implement and plant engaging member to the drying member.

18. In a harvester, a substantially stationary plant engaging member, a drying member adapted to have telescopic engagement with means carried by said plant engaging member, means to automatically move said drying member relative to the plant engaging member to support severed plants in spaced relation on the drying member, conveying means coöperating with said members to conduct plants to the plant engaging member and to the drying member, and means for retaining the plant engaging member in an operative position.

19. In a harvester, a traveling main frame, stalk severing devices carried thereby, an impaling needle carried by the frame, plant conveying means coöperating with said impaling needle, a plurality of yielding holders engaging opposite sides of the plant engaging member to retain said member in a predetermined position while permitting the conveying means to move plants over the surface thereof, a locking member for each of said holders, and a removable support coöperating with the impaling needle and the plant conveying means whereby severed plants may be arranged in spaced relation upon said removable support.

20. In a harvester, a main frame, an impaling needle and a tubular plant engaging member to receive the plants, a drying member adapted to be slidably mounted within the tubular portion of the impaling needle, a plurality of holders carried by the frame to mount the impaling needle and its tubular plant engaging member in a predetermined position, a removable support coöperating with the tubular member and conveying means coöperating with the impaling needle, its tubular member and the removable support to transmit plants to said removable support in spaced relation thereon.

21. In a harvester, a frame having means to convey a plant in a predetermined position through the frame, leaf protecting means carried by the frame which include leaf raising devices, stalk severing devices connected by the frame adjacent the leaf raising device, stalk engaging and conveying means coöperating with the cutting means and leaf protecting means, and an impaling needle carried by the frame adjacent the stalk severing devices and leaf raising means and coöperating with the conveying means to impale severed plants in an upright position upon the impaling needle.

22. In a harvester, a traveling frame having stalk cutting means, leaf raising means adjacent thereto, an impaling needle adjacent the leaf raising means and in coöperative relation to the stalk cutting means, stalk supporting means to maintain the growing plant in a position to be engaged by the cutting means, and conveying mechanism coöperating with the impaling needle and the stalk supporting means whereby the severed plants may be automatically threaded on the impaling needle.

23. In a harvester, a traveling main frame having conveying means to convey plants in an upright position, means to protect the plant leaves from injury while being conveyed in such position, a dirt shield to protect the leaves from injury by mechanism carried by the main frame, an impaling needle, and means to impale the plants while in such upright position on said needle.

24. In a harvester, a traveling frame having means to convey tobacco plants in an upright position, an impaling needle, leaf raising members at the front of said machine and in advance of the impaling needle, stalk cutting mechanism coöperating with the leaf raising members, whereby when a plant has been severed it may be engaged by the conveying means and transferred to the impaling needle, substantially vertical fixed leaf boards extending longitudinally of the machine to protect the leaves of the plant after it has been impaled upon the needle, means to transfer the impaled plants from the needle to a removable support, inclined leaf guards connecting said leaf raising means with said leaf board, and movable leaf supporting members at the rear of the harvester.

25. In a harvester, an impaling needle, a holder therefor comprising a flat plate, an end of said plate adapted to contact with the impaling needle, a portion thereof being formed to withstand the pressure of the impaling needle, and a stalk engaging guide positioned adjacent said impaling needle.

26. In a harvester, a traveling frame, an impaling needle carried thereby, a holder for supporting said needle comprising a flat bearing plate, an end of said holder being adapted to contact with said impaling needle to limit its movement relative to the frame, a part of the holder being formed of hardened metal to withstand the pressure exerted by the spudding-tool, and a locking member for said holder.

27. In a harvester, a traveling main frame, an impaling needle carried by the frame, a holder for said impaling needle comprising a flat bearing plate, an end of said plate to contact with the impaling needle, a bearing portion of said plate to be engaged by the impaling needle, a stalk engaging guide carried by the frame, a locking member carried by the holder and having a portion thereof extending beyond said guide, and resilient means for maintaining said locking member in operative position.

28. In a harvester, a traveling main frame, an impaling needle carried thereby, a holder for said needle comprising a flat plate, a notched end of said plate adapted to contact with said impaling needle, a bearing portion of said plate being adapted to withstand the pressure exerted by the impaling needle, a bed plate for supporting said holder, means to pivotally mount the holder on the bed plate, and resilient means to maintain the end of the needle holder having the bearing portion into a position to engage a portion of the impaling needle.

In testimony whereof, we affix our signatures, in presence of two witnesses.

ELMER EIDEMILLER MOTTER.
FRANK GOODMAN DAVIS.

Witnesses:
S. O. MITCHELL,
SAML. E. SMITH.